United States Patent
Guy et al.

(10) Patent No.: US 12,461,999 B2
(45) Date of Patent: Nov. 4, 2025

(54) NON-FUNGIBLE TOKENS WITH ENHANCED METADATA

(71) Applicant: Games Global Operations Limited, Douglas (IM)

(72) Inventors: Andrew John Guy, Kwa Zulu Natal (ZA); Dominic James Lennon, Orton-on-the-Hill (GB)

(73) Assignee: Games Global Operations Limited, Douglas (IM)

( * ) Notice: Subject to any disclaimer, the term of this patent is extended or adjusted under 35 U.S.C. 154(b) by 260 days.

(21) Appl. No.: 18/124,925

(22) Filed: Mar. 22, 2023

(65) Prior Publication Data

US 2023/0315819 A1 Oct. 5, 2023

(30) Foreign Application Priority Data

Apr. 4, 2022 (GB) ..................... 2204930

(51) Int. Cl.
*G06F 21/00* (2013.01)
*A63F 13/73* (2014.01)
(Continued)

(52) U.S. Cl.
CPC .............. *G06F 21/12* (2013.01); *A63F 13/73* (2014.09); *A63F 13/77* (2014.09); *A63F 13/79* (2014.09);
(Continued)

(58) Field of Classification Search
CPC ...... G06F 21/12; G06F 21/629; G06F 21/101; A63F 13/73; A63F 13/77; A63F 13/79
See application file for complete search history.

(56) References Cited

U.S. PATENT DOCUMENTS 8,805,434 B2    8/2014    Vasudevan
9,614,829 B1    4/2017    Molina-Markham
(Continued)

FOREIGN PATENT DOCUMENTS

WO    2023048895 A1    3/2023

OTHER PUBLICATIONS

UK Search Report, UK Patent Application No. GB2204930.8, mailed Sep. 27, 2023.
(Continued)

*Primary Examiner* — Ghodrat Jamshidi
(74) *Attorney, Agent, or Firm* — MCDONNELL BOEHNEN HULBERT & BERGHOFF LLP

(57) ABSTRACT

An example embodiment may involve, based on input from an entity, defining, by a computing system, a non-fungible token (NFT) that is associated with metadata representing a value and an expiry time that defines when the NFT expires, wherein the NFT incorporates smart contract functionality to emit an event when the NFT expires, and wherein the NFT is usable by its holder to modify behavior of a software application; submitting, by the computing system, the NFT as an entry proposed for addition to a cryptographically-immutable distributed database; receiving, by the computing system, confirmation that the entry has been added to the cryptographically-immutable distributed database; and listening, by the computing system, for the event, wherein firing of the event causes the value associated with the NFT to be transferred to the entity.

20 Claims, 18 Drawing Sheets

(51) Int. Cl.
*A63F 13/77* (2014.01)
*A63F 13/79* (2014.01)
*G06F 21/12* (2013.01)
*G06F 21/62* (2013.01)
*G06F 21/10* (2013.01)

(52) U.S. Cl.
CPC .......... *G06F 21/629* (2013.01); *G06F 21/101* (2023.08)

(56) References Cited

U.S. PATENT DOCUMENTS

| | | | |
|---|---|---|---|
| 10,946,283 | B1 | 3/2021 | Meilich et al. |
| 11,126,698 | B2 | 9/2021 | Vaish |
| 11,308,487 | B1 | 4/2022 | Foster |
| 11,443,838 | B1* | 9/2022 | Cordonnier ............ G16H 50/70 |
| 11,468,431 | B2 | 10/2022 | Williams |
| 11,557,174 | B2 | 1/2023 | Simons |
| 11,583,772 | B1 | 2/2023 | Thacker |
| 11,607,618 | B1 | 3/2023 | Ahn |
| 11,616,650 | B1 | 3/2023 | Panjwani et al. |
| 11,676,143 | B2 | 6/2023 | Joveski |
| 11,727,478 | B2 | 8/2023 | Andon |
| 11,736,284 | B2 | 8/2023 | Andon |
| 11,756,053 | B2 | 9/2023 | Andon |
| 11,870,905 | B1* | 1/2024 | Park ............ H04L 9/40 |
| 2012/0130856 | A1* | 5/2012 | Petri .................. G06Q 30/0623 705/26.61 |
| 2019/0303600 | A1 | 10/2019 | Hamel |
| 2020/0076798 | A1 | 3/2020 | Lidsky |
| 2020/0134139 | A1 | 4/2020 | Vaish |
| 2020/0242105 | A1 | 7/2020 | Rich |
| 2021/0082044 | A1 | 3/2021 | Sliwka |
| 2021/0118085 | A1 | 4/2021 | Bushnell |
| 2021/0133700 | A1* | 5/2021 | Williams ........... G06Q 20/3829 |
| 2021/0201336 | A1 | 7/2021 | Mallett |
| 2021/0256070 | A1 | 8/2021 | Tran |
| 2021/0279305 | A1 | 9/2021 | Goldston et al. |
| 2022/0016529 | A1 | 1/2022 | Meilich |
| 2022/0035936 | A1 | 2/2022 | Lin |
| 2022/0070011 | A1* | 3/2022 | Frolovichev ........ H04L 67/1396 |
| 2022/0116396 | A1 | 4/2022 | Allu |
| 2022/0173893 | A1* | 6/2022 | Basu .................... H04L 9/3247 |
| 2022/0188839 | A1 | 6/2022 | Andon |
| 2022/0230506 | A1 | 7/2022 | Simons |
| 2022/0261882 | A1* | 8/2022 | Youb ...................... G06Q 50/16 |
| 2022/0305378 | A1* | 9/2022 | Ward ..................... A63F 13/235 |
| 2022/0319173 | A1* | 10/2022 | Ricciardi ............... G06V 20/46 |
| 2022/0366495 | A1* | 11/2022 | Gottehrer ................ G06F 21/64 |
| 2022/0366762 | A1* | 11/2022 | Nelson ................ G07F 17/3244 |
| 2023/0017499 | A1* | 1/2023 | Agrawal ............... H04L 9/3236 |
| 2023/0041807 | A1 | 2/2023 | Benedetto |
| 2023/0042269 | A1 | 2/2023 | Benedetto |
| 2023/0069649 | A1 | 3/2023 | Goldston |
| 2023/0079127 | A1 | 3/2023 | Benedetto |
| 2023/0119641 | A1 | 4/2023 | Meyers |
| 2023/0119838 | A1 | 4/2023 | Meyers |
| 2023/0122552 | A1 | 4/2023 | Meyers |
| 2023/0138797 | A1* | 5/2023 | Kurian .................. G06F 21/602 713/193 |
| 2023/0166185 | A1* | 6/2023 | Hiatt .................... A63F 13/5378 463/1 |
| 2023/0182025 | A1* | 6/2023 | Benedetto ............ G06Q 20/123 463/42 |
| 2023/0186281 | A1* | 6/2023 | Todasco ........... G06Q 20/38215 705/64 |
| 2023/0198760 | A1* | 6/2023 | Ferenczi ................ H04L 9/3234 713/168 |
| 2023/0230069 | A1 | 7/2023 | Voorhees |
| 2023/0249080 | A1 | 8/2023 | Meyers |
| 2023/0259942 | A1* | 8/2023 | Raffay ................. G06Q 20/065 705/64 |

OTHER PUBLICATIONS

Bernstein, 5 business use cases for NFTs, WhatIs.com, Jul. 27, 2021.
JK Intellectual Property Office, Search Report for UK Patent App. No. GB2204931.6, Mailed Jun. 17, 2022.
Vigliarolo, NFTs cheat sheet: Everything you need to know about non-fungible tokens, TechRepublic, May 14, 2021.
Gumaste, "Non-fungible tokens (NFT) for user auth in web 2 apps", Medium, Jan. 22, 2022, Retrieved from the Internet: https://blog.cryptostars.is/non-fungible-tokens-nft-for-user-auth-in-web-2-apps-5a6a758afe5.
International Search Report and Written Opinion, PCT Application PCT/EP2023/052454, mailed Apr. 5, 2023.
Extended European Search Report, European Patent Application No. 23166406.1, mailed Aug. 23, 2023.
Finzer, Devin, "The Non-Fungible Token Bible: Everything you need to know about NFTs", Jan. 10, 2020, Retrieved from the Internet: URL:https://opensea.io/blog/articles/non-fungible-tokens [retrieved on Oct. 26, 2021].

* cited by examiner

FIG. 5

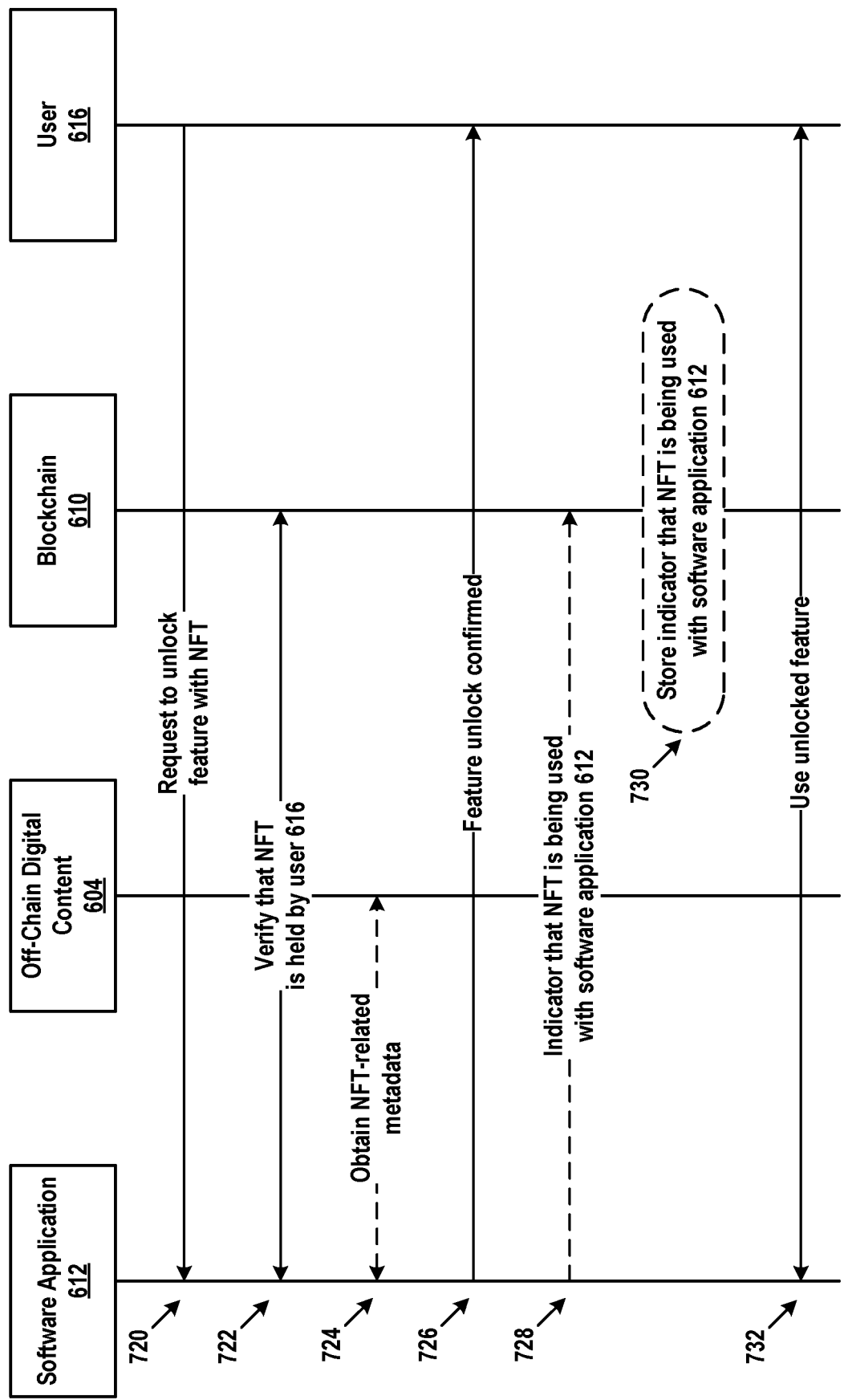

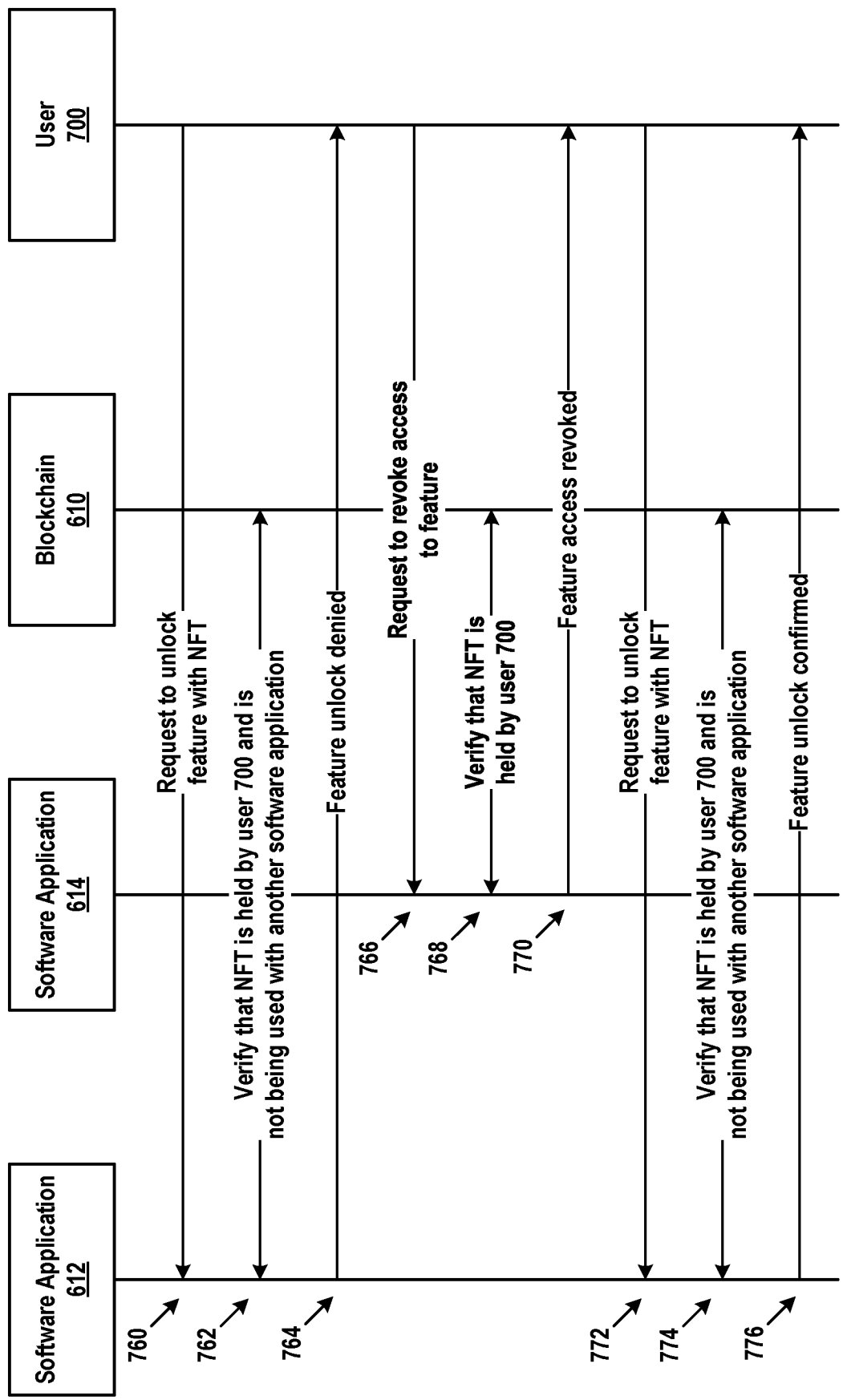

NON-FUNGIBLE TOKENS WITH ENHANCED METADATA

CROSS-REFERENCE TO RELATED APPLICATION

This application claims priority to U.K. Patent Application No. GB2204930.8, filed Apr. 4, 2022, which is hereby incorporated by reference herein.

BACKGROUND

A software application can exhibit a number of features, some or all of which are available to various users of the application. In the case that not all features are available to a given user, the unavailable features are said to be locked for that user. The user may be granted access to unlock and thus use these features upon request or after otherwise carrying out some activity that has been previously determined to cause such unlocking (e.g., entry of a cryptographic key into the software application). Features may be locked or unlocked individually and per user. Thus, each user may have different sets of locked and unlocked features within the software application.

Traditionally, the locked/unlocked status of a feature is granted to a user (e.g., to the user's account identifier) and is not transferable. Thus, a user for whom a particular feature is unlocked cannot share access to this feature with other users. As a consequence, some users will have unlocked features that they have never used or no longer use, while other users might desire access to these features but are locked out of using them.

This fundamental limitation in software architecture wastes resources, such as memory, maintaining state for unused features. Further, it lacks flexibility in terms of how features are designed as well as accessed by users. It also prevents users who have access to an unlocked feature on one software application from transferring this access so that they can use it to unlock an analogous feature on another (potentially independent) software application. Moreover, management of features in this fashion is prone to hacking where users can be improperly granted or denied access to features.

SUMMARY

The embodiments herein solve these and potentially other technical problems related to software by employing non-fungible tokens (NFTs) as representations of the status of one or more features of a software application with respect to a user. These NFTs may be stored in a cryptographically-immutable distributed database, such as a blockchain, using blockchain-based technology, or another mechanism. Generally, NFTs act as digital certificates of authenticity—they are easily verifiable, and the blockchain contains a history of previous owners.

A first user holding an NFT representing a particular feature may be granted access to unlock that feature on one or more software applications that recognize the NFT as a means of unlocking the feature. For example, the first user may request that the feature be unlocked in a particular software application. This software application may then read a blockchain to verify that the NFT is assigned to the first user and not otherwise in use, and then unlock the feature for the first user. The NFT may contain a unique token representing the feature as well as other possible metadata governing how the feature is to be applied once unlocked (e.g., how many times and/or for how long).

Advantageously, access to the feature lies with the NFT rather than strictly with the user or the software application. Thus, the first user may transfer the NFT to a second user, e.g., by way of typical blockchain activities. The second user may then request that the feature be unlocked in the software application. The software application may read the blockchain to verify that the NFT is now assigned to the second user, and then unlock the feature for the second user.

Doing so may automatically cause the feature once again to be locked for the first user, as the first user no longer holds the NFT. Alternatively or additionally, each time a user accesses the software application or attempts to use the feature, the software may check the blockchain to determine whether there exists an NFT held by the user that grants them access to unlock the feature.

Such unlockable features can have a wide scope. They may refer to modules of the software application, data to be used with the software application, data output from the software application, logic that changes the operation of the software application, changes to the appearance of the software application (e.g., different color schemes, animations, or sounds), and/or other possible functions and information. An NFT granting access to such a feature may be created by the party who has developed or who operates the software application, for example, or a third party not otherwise associated with the software application. The NFT's interaction with the software application may be governed by one or more smart contracts or by other programmatic techniques.

The proposed embodiments have a number of technical advantages over traditional feature management in software applications. Notably, access to a feature is logically decoupled from users and software applications, and thus can be transferred between users without requiring that this transfer be mediated by the software application that provides the feature or a party that owns or operates the software application. Thus, the software application can be used more efficiently, not needing to maintain and manage state for whether each feature is locked or unlocked for each user. Also, use of the software application is simplified from the user's perspective, as a user who wishes to unlock a feature of the software application can obtain an appropriate NFT from any source that provides such NFTs and not just a party that owns or operates the software application. And, given the immutable nature of blockchains, access to features can be managed in a more secure fashion that is cryptographically resistant to hacking attempts.

Furthermore, different or independent software applications that provide the same, similar, or analogous features may each allow the same NFT to unlock these features. For example, suppose that multiple automobile manufacturers each make automobiles that support an autonomous driving feature that can be activated by way of an NFT. A user holding an autonomous driving NFT may apply that NFT to an automobile from any of these manufacturers to unlock this feature. Thus, the user may unlock the feature when using their own automobile, a borrowed automobile, or a rented automobile, regardless of manufacturer. In this fashion, access to the feature is not only decoupled from the user (because it can be transferred to other users), but is also not tied to any particular instance or implementation of a software application that provides the feature.

Moreover, some such NFTs may have a limited number of uses before they are considered no longer functional. For example, a single-use NFT might be temporarily or permanently able to unlock a specific feature of a software application one time and then the NFT is considered to be "burnt" and otherwise non-functional. NFTs with a limited number of uses may be suitable for providing, as an example, temporary Internet hotspot access on demand when a user is traveling (here, the "software application" is any application that governs or provides Internet access in the hotspot), a limited number of uses of the software application (e.g., 1, 5, 10, etc.), or use of the software application for a specific time period (e.g., 1 hour, 1 day, 1 month, etc.).

In view of these possibilities, an NFT may be assigned values, capabilities, or programmatic logic that can be used in conjunction with a software application to cause the software application to behave differently (e.g., unlock features). Thus, the NFT may adhere to certain rules, encoded within the NFT itself, within a smart contract on a blockchain, and/or within a software application that govern its use.

In some cases, these rules may limit the time period of the NFT's effectiveness to some number of days, weeks, months, or years from the date of the NFT's creation or from some other date. Thus, the user who holds such a time-limited NFT may continue to hold the NFT (knowing that it may eventually loses its abilities), use it (e.g., "burn" one of the uses of the NFT if it is limited use), or transfer it to another user. Such a transfer may result in the transferring user being compensated in kind, e.g., with another NFT or some other item of value.

Some embodiments may involve the NFT representing an outcome of a software application, e.g., data representing a result of processing carried out by the software application. This NFT with its associated data may then be kept by a user or transferred to other users as desired. Such an outcome may be the result of executing a software application on certain input (e.g., search engine results or transformation of a document from one format to another), a document proving that the user has conducted some form of transaction (e.g., a digitally-signed verification token), or some other data of interest.

Further embodiments may involve the NFT being a "black box" with an effect on one or more software applications that is unknown to users until the NFT is applied to such a software application. Such an NFT could be transferred between users on a speculative basis until one of the users decides to apply the NFT to discover what it represents.

These are just a few example embodiments relating to how NFTs can be used in conjunction with software applications to unlock features therein or otherwise modify the behavior thereof. Other examples are possible.

Accordingly, a first example embodiment involves receiving, by a software application and from a user device, a request for a user to access the software application. For the embodiment, the request refers to an NFT stored in a cryptographically-immutable distributed database and an address of the user for the cryptographically-immutable distributed database, wherein an identifier of the user is associated with the software application. The first example embodiment may further involve, possibly in response to receiving the request, determining, by the software application, that the address of the user holds the NFT by reading one or more blocks of entries stored in the cryptographically-immutable distributed database. The first example embodiment may further involve, in response to determining that the address of the user holds the NFT, (i) granting, by the software application, the identifier of the user access to a feature of the software application, and (ii) transmitting, by the software application and to the user device, confirmation that access to the software application has been granted.

A second example embodiment involves, possibly based on input from an entity, defining, by a computing system, an NFT that is associated with metadata representing a value and an expiry time that defines when the NFT expires, wherein the NFT incorporates smart contract functionality to emit an event when the NFT expires, and wherein the NFT is usable by its holder to modify behavior of a software application. The second example embodiment may further involve submitting, by the computing system, the NFT as an entry proposed for addition to a cryptographically-immutable distributed database. The second example embodiment may further involve receiving, by the computing system, confirmation that the entry has been added to the cryptographically-immutable distributed database. The second example embodiment may further involve listening, by the computing system, for the event, wherein firing of the event causes the value associated with the NFT to be transferred to the entity.

A third example embodiment involves receiving, by a gaming software application and from a user device, a request for a user to access the gaming software application, wherein the request refers to an NFT stored in a cryptographically-immutable distributed database and an address of the user for the cryptographically-immutable distributed database, wherein an identifier of the user is associated with the gaming software application. The third example embodiment may further involve, in response to receiving the request, determining, by the gaming software application, that the address of the user holds the NFT by reading one or more blocks of entries stored in the cryptographically-immutable distributed database. The third example embodiment may further involve, in response to determining that the address of the user holds the NFT, (i) granting, by the gaming software application, the identifier of the user access to a feature of the gaming software application, and (ii) transmitting, by the gaming software application and to the user device, confirmation that access to the gaming software application has been granted.

A fourth example embodiment involves defining, by a computing system, an NFT that is associated with metadata representing an outcome of a software application, wherein the NFT is usable by its holder to modify behavior of the software application. The fourth example embodiment may further involve submitting, by the computing system, the NFT as an entry proposed for addition to a cryptographically-immutable distributed database. The fourth example embodiment may further involve receiving, by the computing system, confirmation that the entry has been added to the cryptographically-immutable distributed database. The fourth example embodiment may further involve transferring, by the computing system, the NFT to an entity that has obtained the outcome of the software application.

In a fifth example embodiment, an article of manufacture includes a non-transitory computer-readable medium, having stored thereon program instructions that, upon execution by a computing system, cause the computing system to perform operations in accordance with the first, second, third, and/or fourth example embodiment.

In a sixth example embodiment, a computing system includes at least one processor, as well as memory and program instructions. The program instructions may be stored in the memory, and upon execution by the at least one processor, cause the computing system to perform operations in accordance with the first, second, third, and/or fourth example embodiment.

In a seventh example embodiment, a system includes various means for carrying out each of the operations of the first, second, third, and/or fourth example embodiment.

These, as well as other embodiments, aspects, advantages, and alternatives, will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

BRIEF DESCRIPTION OF THE DRAWINGS

FIG. 5 depicts a feature matrix for a software application, in accordance with example embodiments.

FIGS. 7A, 7B, 7C, and 7D are message flow diagrams, in accordance with example embodiments.

DETAILED DESCRIPTION

Figure 1:
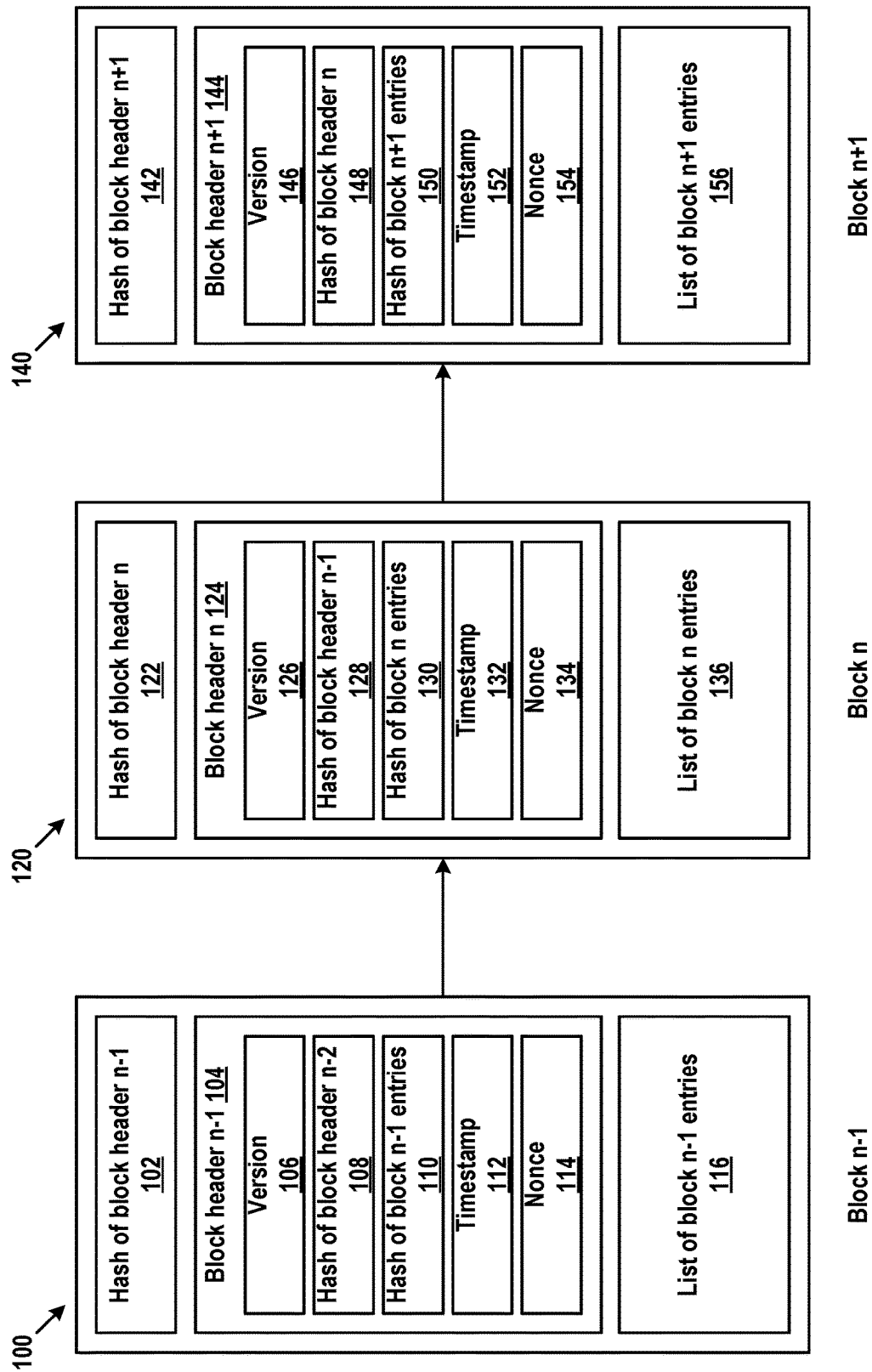
FIG. 1 depicts a blockchain structure, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. INTRODUCTION

Blockchain-based technology underlies and facilitates a form of decentralized computing that has been used to provide cryptocurrencies, smart contracts, non-fungible tokens (NFTs), identity protection, and secure voting, among many other applications. There is speculation, at least from some sources, that a new version of the worldwide web ("web 3.0") can be built atop one or more blockchains. Regardless, it appears indisputable that blockchain-based technology has had an impact on computer networks and other aspects of society even though it has only existed in a practical form for a little over a decade.

Herein, "blockchain-based" technology refers to any variation of blockchain technology or any technology that employs or relies upon blockchain mechanisms. This includes current and future variations of blockchain technology.

In short, a blockchain is a list entries stored as distributed database that can grow over time based on consensus protocols carried out by blockchain nodes. Groups of entries are added to the blockchain within data structures that take the form of blocks, and sequential blocks are cryptographically linked to one another. The blockchain nodes are computing devices or computing systems that can communicate with one another in a peer-to-peer fashion using blockchain software, and thus may reside in different locations and may be operated by different entities. Blockchain nodes may form an overlay on an existing computer network (e.g., the Internet) and may be jointly referred to as a blockchain network. To maintain independence and the decentralized character of the blockchain, each blockchain node may store its own copy of the entire blockchain.

Each block contains a cryptographic hash of the previous block in the blockchain, a timestamp, and data. The cryptographic hash may be produced by any one-way (hash) function that is mathematically and/or computationally impractical to reverse, such as SHA-256, SHA-512, RIPEMD-160, or Whirlpool. The sequential linking of blocks through a cryptographic hash chain makes it difficult for any party to modify a recently-placed block, and virtually impossible to modify earlier blocks. With such a property, blocks in a blockchain may be referred to herein as "cryptographically secure" or "cryptographically-immutable".

Each blockchain user has a unique address to use with the blockchain. Each user also has a public key/private key pair that is cryptographically associated such that data encoded with the public key can be only be decoded by the corresponding private key, and vice versa. Thus, data encoded with a user's public key are effectively encrypted so that they can only be decrypted by the user's private key, and data encoded with the user's private key results in a digital signature that is verifiable with the user's public key.

An entry is typically some form of transaction between two or more users that includes the address of the "sending" user, the information being "sent," and the address of one or more "receiving" users, all of which is signed with the digital signature of the sending user. Thus, the entry can easily be verified to be from the sending user (the sending user is authenticated) and have integrity (the entry was not changed after signing) as well as non-repudiation (the sender cannot later deny having signed the entry). The information being sent may be some amount of cryptocurrency, input for a smart contract, or some other token. In some cases, the sender or receiver may be non-human (e.g., a smart contract, a machine learning model, or software in general).

Proposed new entries are received by one or more blockchain nodes and their digital signatures are authenticated. In some cases, the validity of each proposed entry may also be verified (e.g., an entry on a cryptocurrency blockchain cannot cause an amount of cryptocurrency held by the sender to be less than zero). These entries are formed into blocks, and then these blocks are distributed across the blockchain network to the other blockchain nodes. Each block may include one or more entries.

Each blockchain node independently authorizes received blocks through an agreed-upon consensus protocol. An example of such a protocol is "proof of work," where the blockchain nodes attempt to solve a mathematical puzzle by trial and error. For instance, the consensus protocol may require that the blockchain nodes attempt to find a nonce (e.g., an unknown value) such that a cryptographic hash function performed over the block with the nonce appended results in a hash value with a specified number of leading zeros. The process of carrying out this protocol is often referred to as "mining" and requires a significant amount of computational power.

The first blockchain node that discovers a suitable nonce broadcasts this nonce and the resulting hash value to the rest of the blockchain network. It is trivial for the other blockchain nodes to validate whether the nonce and hash value are correct by simply applying the hash function. Such a block is said to have been "mined" and the discoverer may be awarded accordingly (e.g., with a small amount of cryptocurrency) to motivate participation in the protocol. Once a simple majority of the blockchain nodes agree that the block has been mined, the block is added to the blockchain by all blockchain nodes. Note that not all blockchain nodes need to act as miners in this fashion.

The cryptographic linking of blocks, as well as a proof of work protocol being used for consensus, makes illegitimate modifications of a blockchain to be practically infeasible, as an attacker must modify all subsequent blocks in order for the modifications of one block to be accepted. Thus, blocks on a blockchain are considered to be backwardly-immutable. Nonetheless, other consensus protocols, such as those based on proof of stake, may be used instead.

FIG. 1 provides an example of blockchain data. In this example, three sequential blocks of a blockchain are shown, blocks 100, 120, and 140. In terms of the sequential relationship between these blocks, block 100 may also be referred to as block n−1, block 120 may also be referred to as block n, and block 140 may also be referred to as block n+1. Thus, block n−1 appears immediately before block n in the ordering of the blockchain, and block n appears immediately before block n+1 in the ordering of the blockchain. An arbitrary number of blocks may precede block n−1 and an arbitrary number of blocks may follow block n+1.

Each of the blocks may include three main parts. Thus, block 100 includes hash 102, block header 104, and entries 116. Likewise, block 120 includes hash 122, block header 124, and entries 136, and block 140 includes hash 142, block header 144, and entries 156. Hash 102 is the resulting hash value from applying a hash function to block header 104, hash 122 is the resulting hash value from applying a hash function to block header 124, and hash 142 is the resulting hash value from applying a hash function to block header 144. It is presumed that the same hash function is used for each of these operations, though it is possible to eliminate this presumption. Entries 116, 136, and 156 are respective lists of entries within each block.

Block header 104 includes version 106, hash 108 of the previous block header in the blockchain, hash 110 of entries 116, timestamp 112, and nonce 114. Version 106 may indicate the version number of the blockchain. If changes are made to how the blockchain operates, version 106 may be modified. Hash 108 is the resulting hash value from applying a hash function to block header n−2. Hash 110 is the resulting hash value from applying a hash function to entries 116. Hash 110 may be a Merkle root representation of Merkle tree processing of entries 116. Timestamp 112 may be an indication of the time when the block was successfully mined and/or added to the blockchain. Nonce 114 may be the nonce value of the block found during mining.

In a similar fashion, block header 124 includes version 126, hash 128 of the previous block header in the blockchain, hash 130 of entries 136, timestamp 132, and nonce 134. Likewise, block header 144 includes version 146, hash 148 of the previous block header in the blockchain, hash 150 of entries 156, timestamp 152, and nonce 154.

As noted, this overall data structure has the property that blocks placed on the blockchain are effectively immutable. This is because the each block header contains a hash of its associated entries as well as a hash of the previous block header, and then a hash is calculated for the block header itself. These hashes recursively chain the integrity of the blocks so that any attempt to modify a block illegitimately would require modification of all subsequent blocks as well. Such changes would need to be separately made on enough blockchain nodes to cause the consensus protocol to accept the modification. If these blockchain nodes are distributed, independently operated, and/or independently secured, doing so is impractically difficult.

Notably, other data and arrangements thereof can be used in a blockchain while maintaining these desirable properties. Thus, the embodiments herein are not limited to those of FIG. 1.

Figure 2:
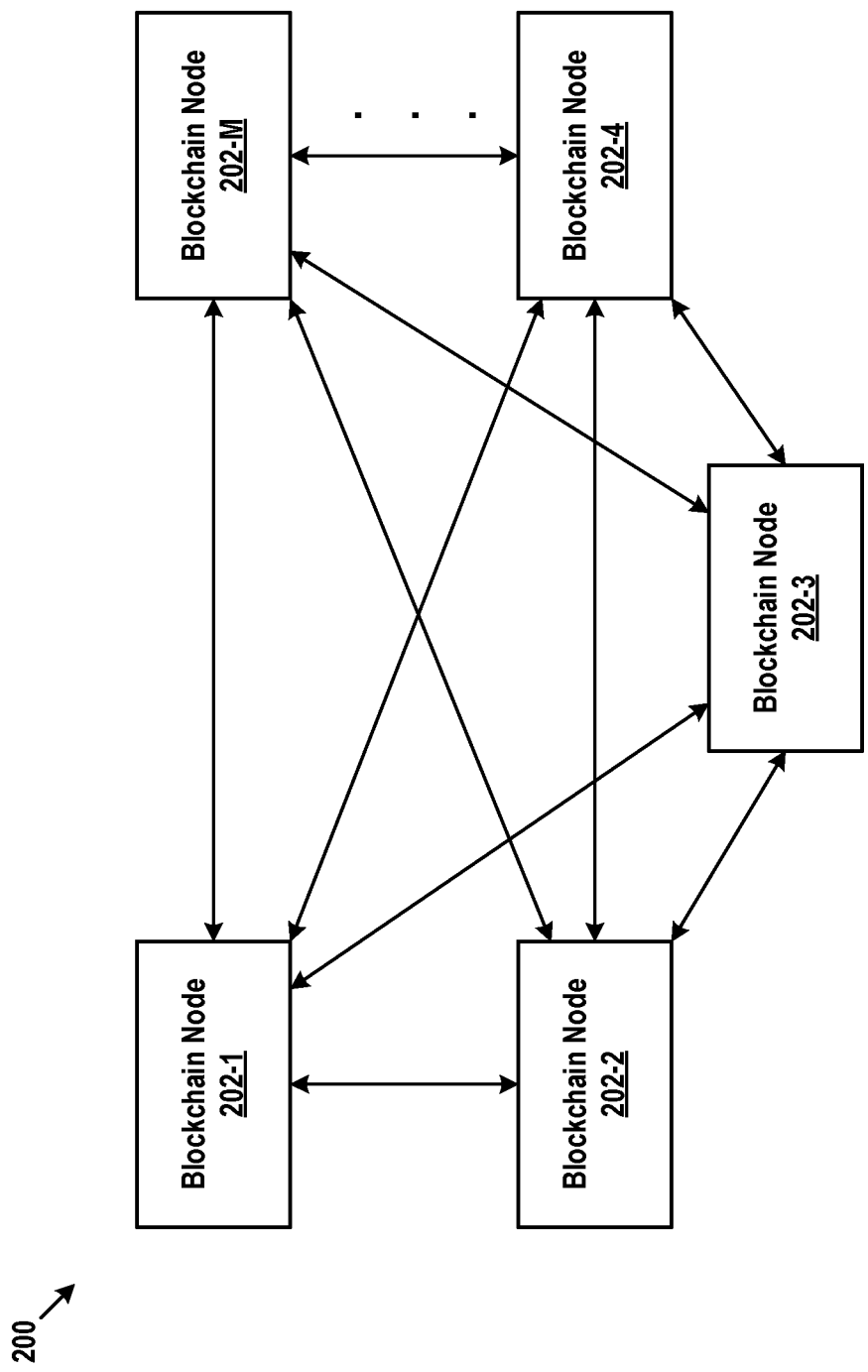
FIG. 2 depicts a network of blockchain nodes, in accordance with example embodiments.

An example network of blockchain nodes is shown in FIG. 2. Blockchain network 200 includes M blockchain nodes 202-1, 202-2, 202-3, 202-4, . . . , 202-M, with the ellipsis indicting that any number of blockchain nodes may be included. As noted, these blockchain nodes operate in a peer-to-peer fashion, with each blockchain node broadcasting the results of mined blocks to the other nodes and following a consensus protocol to determine which blocks are ultimately placed on the blockchain. Also as noted, each blockchain node may store an entire copy of the blockchain. Thus, a blockchain network is a form of redundant distributed database.

From time to time, a blockchain may undergo a fork and effectively change its character or become two different blockchains. Notably, the integrity of a blockchain relies on the blockchain nodes thereof agreeing on the rules used to add blocks and maintain history. If these nodes do not or cannot agree on the rules, or collectively agree to adopt a new set of rules, a fork is said to have occurred. Forks may cause subsequent blocks in the blockchain to have a different version number in their block headers.

Some forks are accidental and short-lived. For instance, two miners may complete successful mining of a block at about the same time. After these miners begin broadcasting their solutions to the block, different blockchain nodes may add one or the other of these blocks to their local copies of the blockchain. Eventually, the addition of subsequent blocks will cause one of these versions of the blockchain to become longer than the other, and the blockchain nodes will abandon (orphan) the shorter version.

On the other hand, an intentional fork can happen when the rules are changed for at least some of the blockchain nodes. A soft fork occurs when the rules are changed in a backward-compatible fashion for a majority of the blockchain nodes (e.g., to add new types of entries). Thus, a single blockchain remains, with the blockchain nodes for which the rules have not been updated still recognizing new blocks as valid. Eventually, all blockchain nodes may be updated to the new rules.

A hard fork occurs when a majority of the blockchain nodes adopt new rules that render blocks produced by the new rules to be considered invalid under the old rules. Unless all blockchain nodes upgrade to the new rules, a permanent split can occur with a single blockchain diverging to become two independent blockchains—one operating in accordance with the new rules and the other operating in accordance with the old rules.

One of the major uses of blockchain technology, in addition to supporting cryptocurrencies, is the formation and execution of smart contracts. Smart contracts are executable logic (e.g., programs or code snippets) that are placed in entries. A smart contract's logic is executed when certain predetermined conditions are met. A simple smart contract may consist of "if-X-then-Y" logic, where X is a set of one or more conditions and Y is a set of one or more operations to be carried out when X becomes true.

Smart contracts typically exist as entries on a blockchain employing "server" functionality outside of the direct control of users of the blockchain (i.e., a user may write and deploy a smart contract, but then the smart contract operates as programmed even if the user decides later that they do not approve of the smart contract). Users interact with a smart contract by submitting data that cause execution of functions defined by the smart contract. Smart contracts can define rules and automatically enforce these rules via programmatic logic (e.g., software code). Smart contracts typically cannot be deleted, and interactions with them are generally irreversible. The operations of a smart contract may involve the smart contract generating output, including possibly adding one or more further entries to the blockchain.

An implementation of smart contracts is the Ethereum ERC-20 standard. It defines an application programming interface (API) through which smart contracts are specified, queried, and executed. The mechanism through which ERC-20 does so is contract-defined tokens that can be transferred between users of the blockchain. These tokens may have some associated value or inherent sematic meaning to user or software applications that interact with the blockchain. Such tokens are identified by the address of the ERC-20 smart contract in which they are defined, and thus are essentially a string of bits that is unique per blockchain.

As an example, ERC-20 smart contract logic may specify that when a condition specified by the smart contract (X) becomes true, the smart contract will create an entry on the blockchain indicating that the user has been granted a certain permission (Y). Determining whether the condition (X) is true may require data from an off-chain source, e.g., a weather report, an account balance, sensor data, etc. Since blockchains are fundamentally deterministic and conditional data is likely to change over time, an oracle is used to obtain off-chain data as needed.

Oracles are decentralized on-chain APIs that can obtain off-chain data from multiple sources. In some cases, oracles can send data to off-chain recipients. Oracles use consensus protocols to determine which off-chain data source is accurate at a given point in time, and then write this data to the blockchain. Doing so mitigates the possibility that one or more of the off-chain data sources gets hacked or otherwise subverted, as the consensus protocol will select the majority or plurality of data sources that agree.

In other words, an oracle is a distributed application that, when invoked, writes "trusted" data to the blockchain. This data then becomes an immutable record of the value of corresponding off-chain data at a given point in time. For instance, if an oracle is called at noon on Mar. 13, 2022 to obtain the temperature in a particular geographic location, the oracle accesses one or more external APIs to do so (e.g., obtaining and parsing weather data from governmental and/or commercial sources), follows the consensus protocol to determine the "trusted" temperature, and writes this "trusted" temperature to the blockchain. Then, any smart contract with a condition (X) that requires knowing the temperature in the particular geographic location at noon on Mar. 13, 2022 can read this blockchain entry at any time in the future.

Alternatively or additionally, off-chain software tools may be used to check the status of a smart contract and then add entries as necessary for operations (Y). In some cases, these further entries may also be smart contracts with different sets of conditionally-executable logic. Thus, smart contracts can be chained to perform a complex series of operations.

As noted, ERC-20 smart contracts can use tokens to carry out these activities. Within each smart contract, a finite number of tokens are available and can be distributed to and held by various users. For instance, if the temperature is above 70 degrees Fahrenheit in a particular location at a particular time, one or more tokens can be transferred to a particular user. The particular user holding these tokens represents the outcome of checking the condition, or certain capabilities granted to the particular user based on this outcome.

Importantly, each token is fungible, in that all tokens are considered identical and replaceable by one another. Thus, fungible tokens operate in a similar fashion to units of fiat currency. Indeed, cryptocurrencies can be based on fungible tokens. But these tokens have more general uses. Regardless, tokens can be transferred to or from smart contracts as antecedents of operations (Y) or as part of operations (Y).

In contrast, an NFT is a unique, irreplaceable token can exist within a smart contract. Since there is only one copy of an NFT in existence, NFTs are analogous to works of art or real estate. While current popular uses of NFTs are for tracking the ownership of digital content, NFTs are more generally applicable. Notably, the term "NFT" is often used erroneously to refer to the tracked digital content itself, but an NFT is more accurately thought of as a unique token within a smart contract that refers to the digital content.

NFTs are generated, or "minted", through creation of these smart contracts. To that point, an implementation of NFTs is the Ethereum ERC-721 standard. Like ERC-20, ERC-721 defines an API through which smart contracts are specified, queried, and executed. A difference is that ERC-20 allows a smart contract to be associated with a number of tokens that are fungible with respect to one another, while ERC-721 allows a smart contract to be associated with one or more NFTs. Thus, each NFT is defined by the address of the ERC-721 smart contract in which they are defined as well as a unique token identifier, allowing a single ERC-721 smart contract to manage multiple unique NFTs.

The ERC-721 API allows the holder of an NFT to be queried, the NFT to be transferred to a different user, the NFT to be transferred to another smart contract, and metadata associated with the NFT to be read. This metadata may include a reference, perhaps in the form of a uniform resource locator (URL) of an off-chain data source that describes the token, such as the location of a JavaScript Object Notation (JSON) file. The JSON file may further specify the digital content over which the NFT defines ownership (e.g., a piece of digital artwork in a graphics file, a piece of music in an audio file, etc.).

Notably, NFTs and smart contracts are not limited to the Ethereum ecosystem or the ERC-20 and ERC721 standards. Different blockchains may support different types of smart contracts that have various data formats and APIs. Some of these blockchains may be Cardano, Solana, or Flow, just to name a few.

Given all of this, current blockchains, smart contracts, and NFTs have a set of generally desirable properties. They are decentralized and thus do not rely upon a single governmental, organizational, or societal authority for their operation. These properties further involve the following.

A blockchain is a typically a public document that can be stored, viewed, and analyzed by anyone. Anyone can become a miner, but a majority control over all mining entities is required to corrupt the blockchain. Any user can create a blockchain "account" by creating a unique address for themselves, and thus interact with other users by way of the blockchain without needing preapproval. Thus, such an account may be referred to as an "address of the user".

Invalid transactions are automatically discarded by blockchain nodes. As noted, blocks are effectively backwardly-immutable (existing blocks cannot be changed) once they are placed on the blockchain, and become even harder to change over time as subsequent blocks are added.

Smart contracts allow transactions to take place between entities in an unambiguous, deterministic manner that is mediated by programmatic logic rather than natural language. This permits the entities to engage in clearly-understood agreements that can be automatically executed with little, if any, room for dispute. The outcome of smart contract execution is memorialized on the blockchain, and thus can be verified for any party.

NFTs are unique digital tokens that can be used to represent rights, capabilities, and/or permissions that can be granted to a user, an entity, or a smart contract. NFTs can be transferred between parties and therefore allow the conveyance or alienation of these rights, capabilities, and/or permissions in an automated and programmatic fashion based on various pre-defined triggers.

As discussed in more detail below, blockchain, smart contract, and NFT technology can be used to facilitate a more flexible way of granting access to features of software applications.

II. EXAMPLE COMPUTING DEVICES AND CLOUD-BASED COMPUTING ENVIRONMENTS

Figure 3:
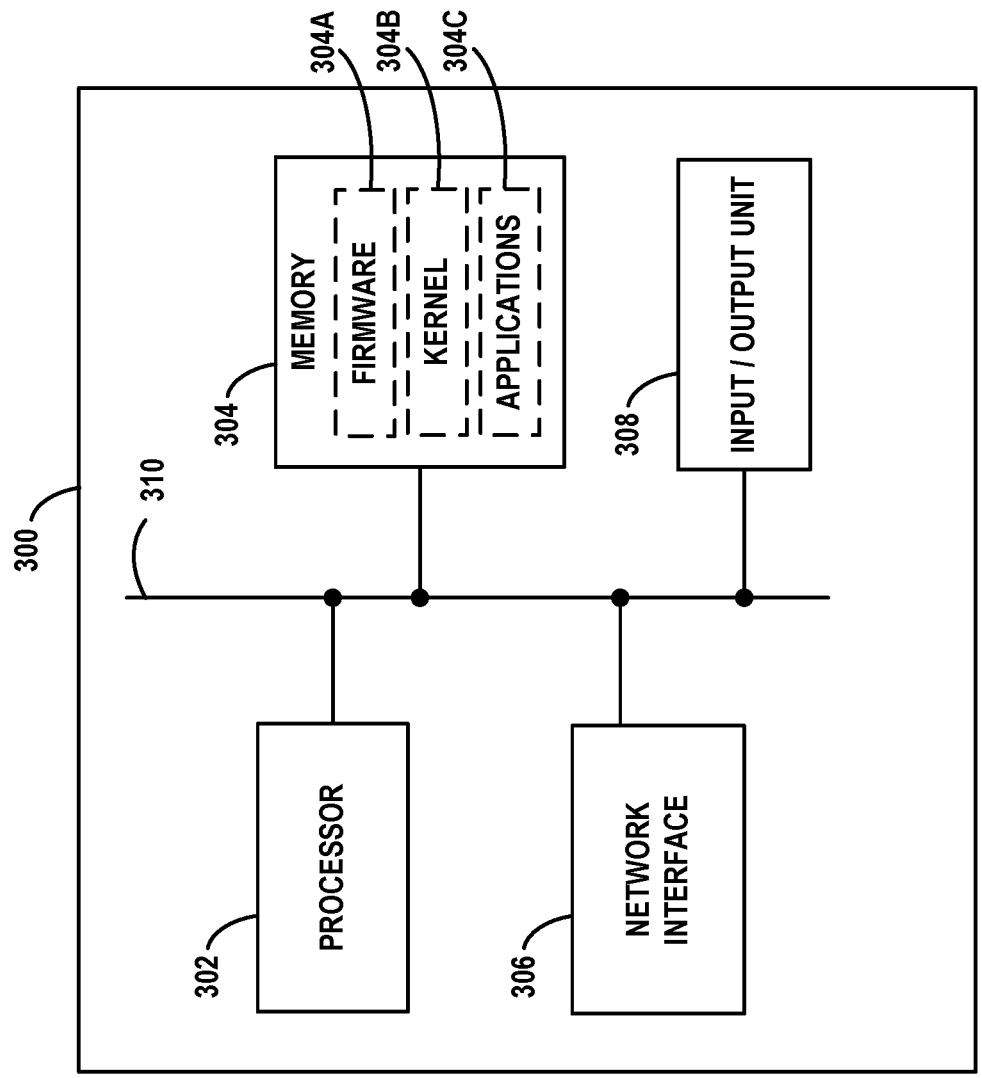
FIG. 3 illustrates a schematic drawing of a computing device, in accordance with example embodiments.

FIG. 3 is a simplified block diagram exemplifying a computing device 300, illustrating some of the components that could be included in a computing device arranged to operate in accordance with the embodiments herein. Computing device 300 could be a client device (e.g., a device actively operated by a user), a server device (e.g., a device that provides computational services to client devices), or some other type of computational platform. Some server devices may operate as client devices from time to time in order to perform particular operations, and some client devices may incorporate server features.

In this example, computing device 300 includes processor 302, memory 304, network interface 306, and input/output unit 308, all of which may be coupled by system bus 310 or a similar mechanism. In some embodiments, computing device 300 may include other components and/or peripheral devices (e.g., detachable storage, printers, and so on).

Processor 302 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 302 may be one or more single-core processors. In other cases, processor 302 may be one or more multi-core processors with multiple independent processing units. Processor 302 may also include register memory for temporarily storing instructions being executed and related data, as well as cache memory for temporarily storing recently-used instructions and data.

Memory 304 may be any form of computer-usable memory, including but not limited to random access memory (RAM), read-only memory (ROM), and non-volatile memory (e.g., flash memory, hard disk drives, solid state drives, and/or tape storage). Thus, memory 304 represents both main memory units, as well as long-term storage. Other types of memory may include biological memory.

Memory 304 may store program instructions and/or data on which program instructions may operate. By way of example, memory 304 may store these program instructions on a non-transitory, computer-readable medium, such that the instructions are executable by processor 302 to carry out any of the methods, processes, or operations disclosed in this specification or the accompanying drawings.

As shown in FIG. 3, memory 304 may include firmware 304A, kernel 304B, and/or applications 304C. Firmware 304A may be program code used to boot or otherwise initiate some or all of computing device 300. Kernel 304B may be an operating system, including modules for memory management, scheduling, and management of processes, input/output, and communication. Kernel 304B may also include device drivers that allow the operating system to communicate with the hardware modules (e.g., memory units, networking interfaces, ports, and buses) of computing device 300. Applications 304C may be one or more user-space software programs, such as web browsers or email clients, as well as any software libraries used by these programs. Memory 304 may also store data used by these and other programs and applications.

Network interface 306 may take the form of one or more wireline interfaces, such as Ethernet (e.g., Fast Ethernet, Gigabit Ethernet, and so on). Network interface 306 may also support communication over one or more non-Ethernet media, such as coaxial cables or power lines, or over wide-area media, such as Synchronous Optical Networking (SONET) or software-define wide-area networking (SD-WAN) technologies. Network interface 306 may additionally take the form of one or more wireless interfaces, such as IEEE 802.11 (Wifi), BLUETOOTH®, global positioning system (GPS), or a wide-area wireless interface. However, other forms of physical layer interfaces and other types of standard or proprietary communication protocols may be used over network interface 306. Furthermore, network interface 306 may comprise multiple physical interfaces. For instance, some embodiments of computing device 300 may include Ethernet, BLUETOOTH®, and Wifi interfaces.

Input/output unit 308 may facilitate user and peripheral device interaction with computing device 300. Input/output unit 308 may include one or more types of input devices, such as a keyboard, a mouse, a touch screen, and so on. Similarly, input/output unit 308 may include one or more types of output devices, such as a screen, monitor, printer, and/or one or more light emitting diodes (LEDs). Additionally or alternatively, computing device 300 may communicate with other devices using a universal serial bus (USB) or high-definition multimedia interface (HDMI) port interface, for example.

In some embodiments, one or more computing devices like computing device 300 may be deployed to support a blockchain and/or blockchain-related architecture. The exact physical location, connectivity, and configuration of these computing devices may be unknown and/or unimportant to client devices. Accordingly, the computing devices may be referred to as "cloud-based" devices that may be housed at various remote data center locations.

Figure 4:
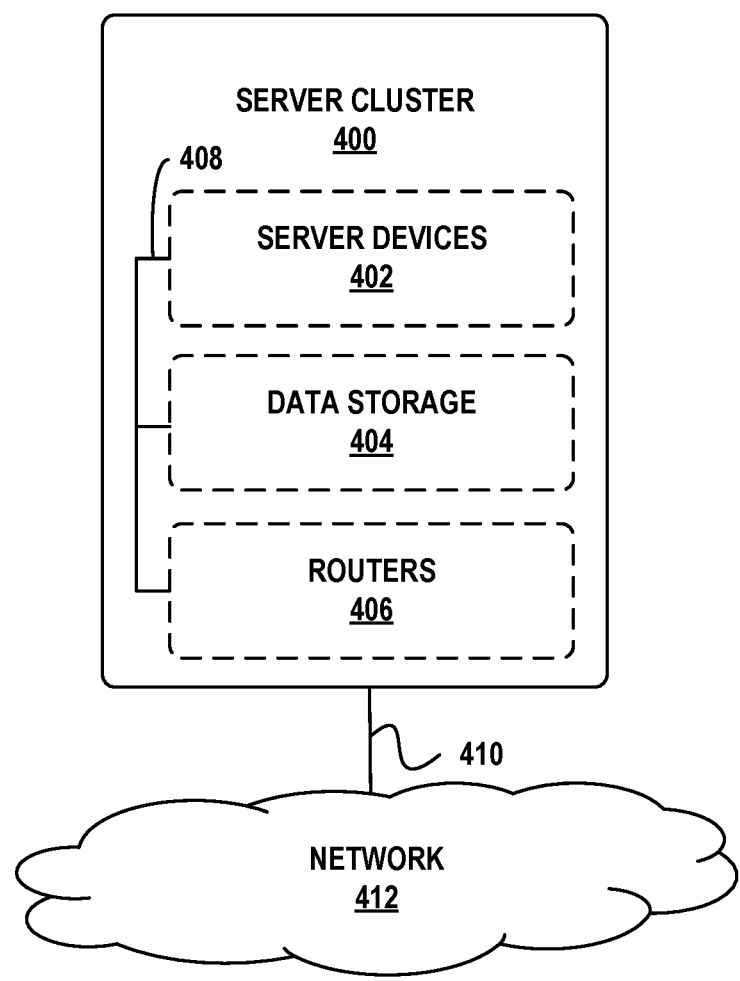
FIG. 4 illustrates a schematic drawing of a server device cluster, in accordance with example embodiments.

FIG. 4 depicts a cloud-based server cluster 400 in accordance with example embodiments. In FIG. 4, operations of a computing device (e.g., computing device 300) may be distributed between server devices 402, data storage 404, and routers 406, all of which may be connected by local cluster network 408. The number of server devices 402, data storages 404, and routers 406 in server cluster 400 may depend on the computing task(s) and/or applications assigned to server cluster 400.

For example, server devices 402 can be configured to perform various computing tasks of computing device 300. Thus, computing tasks can be distributed among one or more of server devices 402. To the extent that these computing tasks can be performed in parallel, such a distribution of tasks may reduce the total time to complete these tasks and return a result. For purposes of simplicity, both server cluster 400 and individual server devices 402 may be referred to as a "server device." This nomenclature should be understood to imply that one or more distinct server devices, data storage devices, and cluster routers may be involved in server device operations.

Data storage 404 may be data storage arrays that include drive array controllers configured to manage read and write access to groups of hard disk drives and/or solid state drives. The drive array controllers, alone or in conjunction with server devices 402, may also be configured to manage backup or redundant copies of the data stored in data storage 404 to protect against drive failures or other types of failures that prevent one or more of server devices 402 from accessing units of data storage 404. Other types of memory aside from drives may be used.

Routers 406 may include networking equipment configured to provide internal and external communications for server cluster 400. For example, routers 406 may include one or more packet-switching and/or routing devices (including switches and/or gateways) configured to provide (i) network communications between server devices 402 and data storage 404 via local cluster network 408, and/or (ii) network communications between server cluster 400 and other devices via communication link 410 to network 412.

Additionally, the configuration of routers 406 can be based at least in part on the data communication requirements of server devices 402 and data storage 404, the latency and throughput of the local cluster network 408, the latency, throughput, and cost of communication link 410, and/or other factors that may contribute to the cost, speed, fault-tolerance, resiliency, efficiency, and/or other design goals of the system architecture.

As a possible example, data storage 404 may include any form of database, such as a structured query language (SQL) database. Various types of data structures may store the information in such a database, including but not limited to tables, arrays, lists, trees, and tuples. Furthermore, any databases in data storage 404 may be monolithic or distributed across multiple physical devices.

Server devices 402 may be configured to transmit data to and receive data from data storage 404. This transmission and retrieval may take the form of SQL queries or other types of database queries, and the output of such queries, respectively. Additional text, images, video, and/or audio may be included as well. Furthermore, server devices 402 may organize the received data into web page or web application representations, or for use by a software application in some other fashion. Such a representation may take the form of a markup language, such as HTML, the eXtensible Markup Language (XML), or some other standardized or proprietary format.

Moreover, server devices 402 may have the capability of executing various types of computerized scripting languages, such as but not limited to Perl, Python, PUP Hypertext Preprocessor (PUP), Active Server Pages (ASP), JAVASCRIPT®, and so on. Computer program code written in these languages may facilitate the providing of web pages to client devices, as well as client device interaction with the web pages. Alternatively or additionally, JAVA® may be used to facilitate generation of web pages and/or to provide web application functionality.

II. EXAMPLE SOFTWARE APPLICATION FEATURE FRAMEWORK

NFT-based technology can be used to improve how access is granted to software applications and features thereof. In some situations, certain features of a software application may not be available to all users. Thus, the status of a feature may be either locked (unavailable) or unlocked (available) on a per-user basis.

Conventionally, this locked/unlocked status of each feature is tied to the user's account (e.g., an identifier of the user), credentials (e.g., a userid and password), a hardware device on which the software application is installed, or a hardware device from which the software application is accessed. Thus, the software application may exist on the user's device, a local or remote server, or a cloud-based computing environment, for example. Here, the term "software application" is used expansively to include single executable programs or suites of programs that are downloadable and/or provided as a non-downloadable service (e.g., software as a service).

The lockable/unlockable features of software applications can take various forms, including but not limited to: (i) general use of a software application itself, (ii) access to a specific software application of a suite of software applications, (iii) access to a specific feature, functionality, or set of functionalities within a software application, (iv) use of a software application or feature thereof a certain number of times, (v) use of a software application or feature thereof for some period of time, and/or (vi) use of a network service some number of times or for some period of time. Other possibilities exist.

As an example, many mobile applications have both a free or low-cost version as well as a premium version. Both versions of the mobile application can be the same unit of software, with access to the premium version granted when the user obtains an add-on license or engages in some other activity that results in the user being granted access to the premium version. The premium version may have a richer set of functionalities, an improved user interface, better performance, different graphics and/or audio, more storage, and/or other features. Use of the premium version granted in this fashion may be time-limited or permanent.

As another example, the user might be an enterprise entity and the software application might be a cloud-based email service for employees of the entity. The entity might initial obtain access to base version of the cloud-based email service, which uses four processor cores, one virtual machine, and 100 gigabytes of storage in a cloud-based computing system. Over time, the enterprise entity might decide that is would like access to unlock access to premium tier of service that provides upgrades versions of these features, e.g., with eight processor cores, two virtual machines, and 500 gigabytes of storage.

This traditional model of controlling access to locked features of a software application typically relies on user-specific access-control mechanisms and is inflexible. Normally, the locked/unlocked status of a feature is granted to a user (e.g., to the user's account in the software application) and is not transferable. Thus, a user for whom a particular feature is unlocked cannot share access to this feature with other users. As a consequence, some users will have unlocked features that they have never used or no longer use, while other users might desire access to these features but are locked out of using them.

This fundamental limitation in software architecture wastes resources, such as memory, maintaining state for unused features. Further, it lacks flexibility in terms of how features are designed as well as accessed by users. It also prevents users who have access to an unlocked feature on one software application from transferring this access so that they can use it to unlock an analogous feature on another (potentially independent) software application.

Moreover, access to features of software applications must be managed and specifically programmed into the software applications by the manufacturer thereof. Each manufacturer therefore may have its own method of doing so, which can lead to user confusion as they navigate between a multitude of access mechanisms across different software applications.

Figure 5:
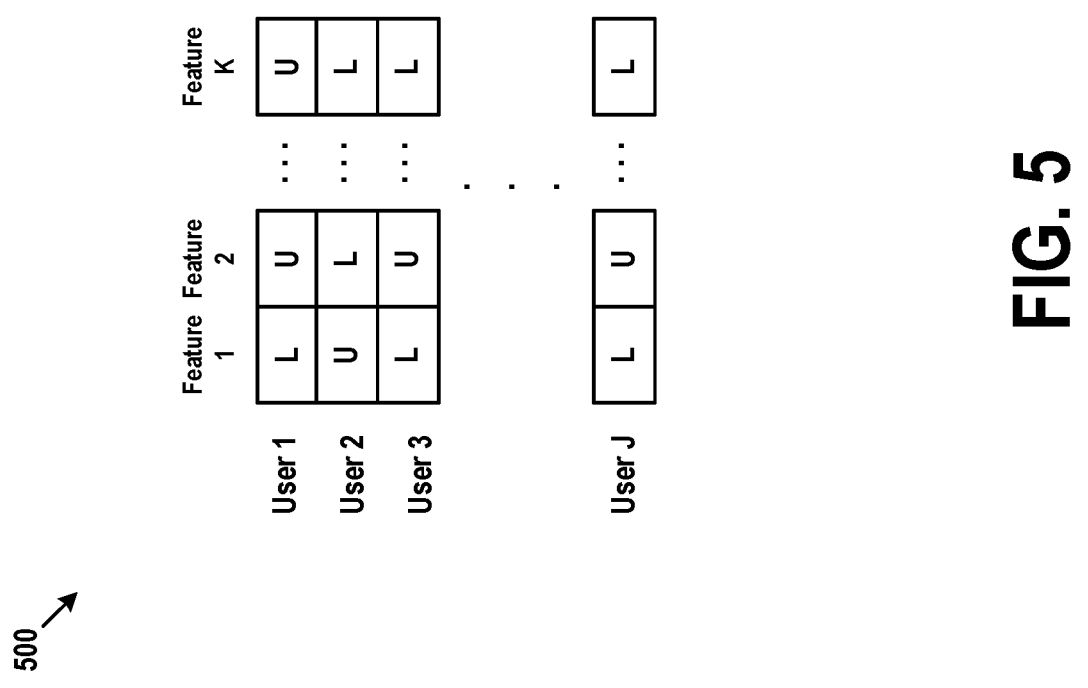

To that point, FIG. 5 depicts a user-feature matrix 500 representing which of J users are granted access to each of K features of a software application. Each element in the matrix is either an "L", indicating that the feature is locked for the user, or a "U" indicating that the feature is unlocked for the user. While the locked/unlocked status is binary indicator, some feature statuses can have varying levels or tiers of access and thus need to be represented with more than a binary indicator.

In FIG. 5, user 1 cannot access feature 1 due to is being locked, but can access features 2 and K due to their being unlocked. User 2 cannot access features 2 and K due to their being locked, but can access feature 1 due to it being unlocked. User 3 cannot access features 1 or K due to their being locked, but can access feature 2 due to it being unlocked. User J also cannot access features 1 or K due to their being locked, but can access feature 2 due to it being unlocked.

The ellipses in FIG. 5 indicate that J and K can take on arbitrarily large values. For instance, in some realistic scenarios, J might be in the hundreds of thousands or millions, which K could be in the dozens or hundreds. Thus, if the status of each feature (e.g., the content of each element in matrix 500) is represented as a single byte, matrix 500 might require 10-100 megabytes of storage, not even considering any associated metadata.

Given that multiple software applications may each contain a structure similar to user-feature matrix 500 to represent individual user access to features of the respective software applications, this amount of required storage is multiplied accordingly. In the case that at least partially-overlapping sets of users and/or partially-overlapping sets of features exist in more than one of these matrixes, the same or similar information is unnecessarily replicated in multiple locations. As a consequence computer storage is used inefficiently.

Further, placing all of this access-related information in a single matrix, data structure, or database can make it a target for hacking. Bad actors may attempt to improperly grant or deny certain users access to certain features, or delete some or all of matrix 500. These hacking attempts may even come from legitimate administrators of matrix 500 who might have incentives to modify it improperly in various ways.

For example, suppose that user-feature matrix 500 (whether implemented as a database or otherwise) is protected by typical security measures (e.g., userids, passwords, two-factor authentication, firewalls, etc.). Nonetheless, it can still be subverted by way of software defects or other exploits, such as social engineering of employees with control over user-feature matrix 500, or by such employees if they are disgruntled. For example, some or all of user-feature matrix 500 and any backup copies could be deleted, an occurrence for which there would be little or no recourse.

The embodiments herein address these and potentially other technical problems related to software by employing NFTs as representations of the status of one or more features of a software application with respect to a user. These NFTs may be stored in a cryptographically-immutable distributed database, such as that of a blockchain or similar technology.

Access to a feature lies with an NFT rather than strictly with the user or the software application. Thus, a user may be granted access to a feature by way of an NFT. When the user logs on to the software application, the software application may check the blockchain to verify that the user holds the NFT. Once verified in this manner, the software application may grant the user access to the feature. If the user does not hold such an NFT, the user may be denied access to the feature.

The user may transfer the NFT to another user, e.g., by way of typical blockchain activities. When the other user logs on to the software application, the software application may check the blockchain in a similar fashion in order to unlock the feature for this user. Thus, unlike convention techniques, the embodiments herein allow access to features of a software application to be easily transferred between users, accounts, and/or entities without requiring that this transfer be mediated by the software application that provides the feature or a party that owns or operates the software application. Also, use of the software application is simplified from the user's perspective, as a user who wishes to unlock a feature of the software application can obtain an appropriate NFT from any source that provides such NFTs and not just a party that owns or operates the software application.

Moreover, the same NFT can be used to mediate access to the same or similar features of multiple software applications. As noted, a user holding an autonomous driving NFT may apply that NFT to any automobile that: (i) supports such a feature, and (ii) allows access to that feature by way of NFTs. Likewise, a user holding an NFT granting access to 100 megabytes of cloud-computing storage may use this NFT with any cloud-computing platform that supports such an NFT.

In this manner, each software application does not need to maintain its own copy of a user-feature matrix (such as user-feature matrix 500), and instead can rely on a blockchain for this functionality. Doing so can dramatically reduce the memory requirements of these software applications (e.g., by tens of megabytes in practical examples).

Further, given the immutable nature of a blockchain, access to features can be managed in a more secure fashion that is cryptographically-resistant to hacking attempts. As noted, the distributed nature of a blockchain, its use of cryptographic one-way functions, and its reliance on proof of work or similar protocols, makes it virtually impossible for a blockchain to be illegitimately modified. As such, there is no practical blockchain analogy to the scenario in which user-feature matrix 500 and/or its backups are deleted—such an occurrence is not practically feasible in a robust blockchain environment.

A. Example Architecture

Figure 6:
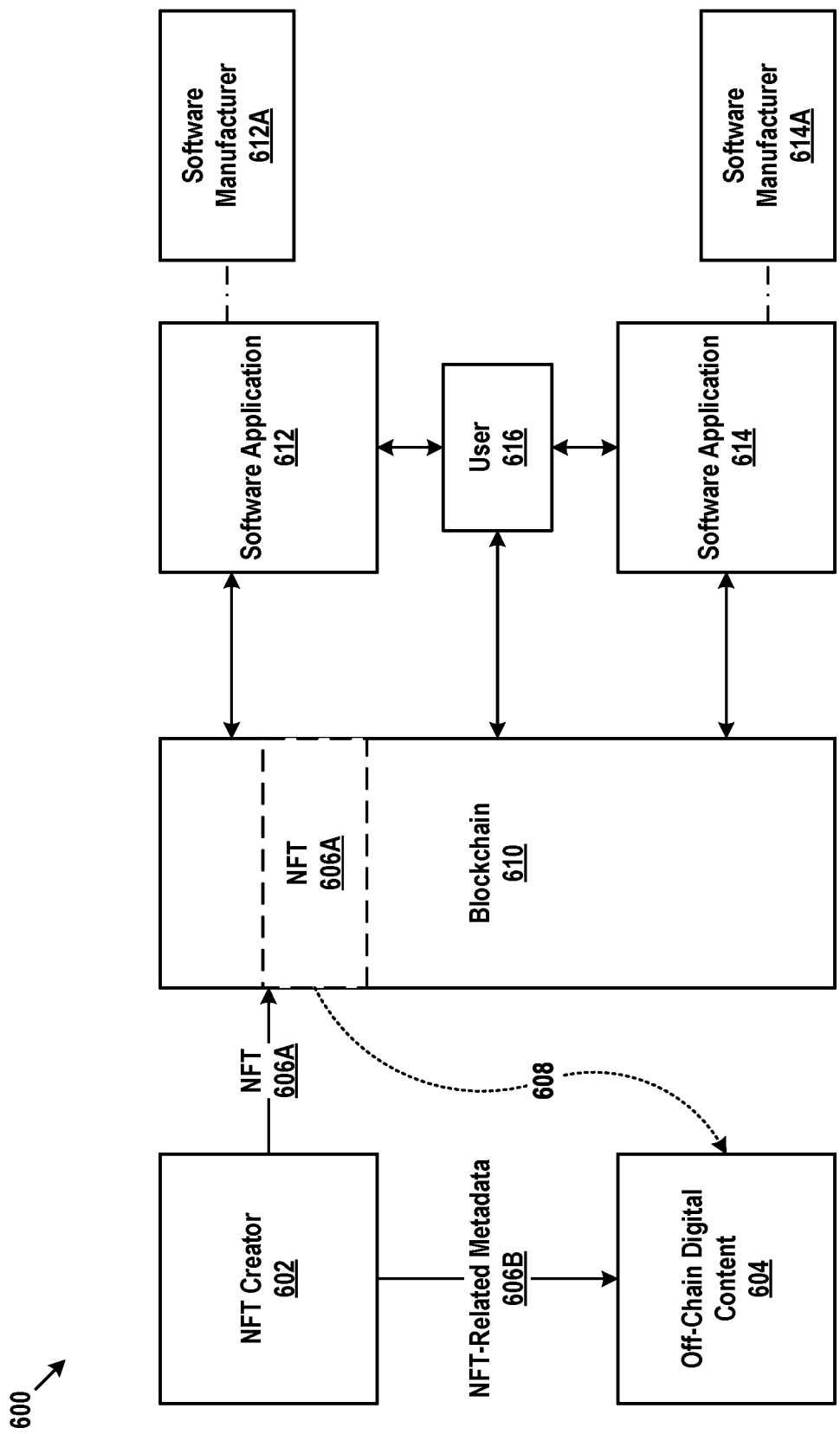
FIG. 6 provides an architecture for providing NFT-based access to features of software applications, in accordance with example embodiments.

FIG. 6 provides an architecture 600 for providing NFT-based access to software applications and features of software applications, in accordance with example embodiments. Architecture 600 includes NFT creator 602, off-chain digital content 604, blockchain 610, software application 612, software manufacturer 612A, software application 614, software manufacturer 614A, and user 616. In various embodiments, more or fewer components and/or entities may be present.

NFT creator 602 may be any entity that mints NFTs for placement on a blockchain. For purposes of the embodiments herein, this process may involve creation of a smart contract specifying NFT 606A therein, associating NFT 606A with NFT-related metadata 606B, and taking steps to place NFT 606A on blockchain 610 and place NFT-related metadata 606B in off-chain digital storage 604. As shown, NFT creator 602 can provide NFT 606A to blockchain 610, where it is shown surrounded by dashed lines to indicate that it is stored therein). In some cases, NFT creator 602 may be required to carry out a compensatory activity in order for NFT 606A to be placed on blockchain 610, such as the transfer of some units of cryptocurrency.

NFT 606A may be a smart contract with one or more NFTs therein (or any other structure that can specify an NFT), each with its own NFT-related metadata. For each, NFT 606A may contain a reference (e.g., a URL) to the location of NFT-related metadata 606B in off-chain digital storage 604. NFT-related metadata 606B may include the actual content and/or the description of the content referred to by NFT 606A. This description may be human-readable (e.g., text) or machine readable (e.g., a programmatic encoding). For purposes of simplicity, it is assumed below that each NFT-enabled smart contract contains just one NFT. But the embodiments herein can be readily generalized to multiple NFTs per smart contract.

Off-chain digital content 604 may be an external or remote database that stores NFT-related metadata 606B as well as other metadata. In some cases, off-chain digital content 604 may be a peer-to-peer system for storing and accessing files, websites, applications, and data, such as the Interplanetary File System (IPFS). But other distributed or non-distributed databases or storage facilities may be used.

Blockchain 610 may be any type of blockchain network that supports NFTs, e.g., via smart contracts. As shown, NFT 606A may be stored in blockchain 610 and may contain a reference 608 to NFT-related metadata 606B as stored in off-chain digital storage 604. Reference 608 is shown in a dotted line to represent that it is a pointer. As noted above, blockchain 610 may be a distributed database of entries that are managed by a consensus protocol carried out by a number of blockchain nodes. In some cases, blockchain 610 might be a public blockchain, accessible to anyone. In other cases, blockchain 610 might be a private blockchain that is only accessible to one or more of software applications 612 and 614, one or more of software manufacturers 612A and 614A, and user 616.

Software application 612 may be a downloadable or non-downloadable set of one or more software applications. Likewise, software application 614 may be another downloadable or non-downloadable set of one or more software applications. Both of software applications 612 and 614 may provide services to users, and may interface with blockchain 610 to look up and interact with feature-related NFTs.

Software manufacturer 612A may be an entity that manufactures, owns, distributes, and/or operates software application 612. Similarly, software manufacturer 614A may be an entity that manufactures, owns, distributes, and/or operates software application 614. In some cases, one or both of software manufacturer 612A or software manufacturer 614A may take on the role of NFT creator 602. Thus, software manufacturer 612A may mint NFTs that can be used to control access to features of software application 612, and software manufacturer 614A may mint NFTs that can be used to control access to features of software application 614. Additionally, either software manufacture (or another entity) may mint NFTs that can be used to control access to features of both of software applications 612 and 614.

User 616 represents one or more individual users or entities that use either one or both of software applications 612 and 614. User 616 may hold (own) one or more NFTs on blockchain 610 that control access to features of software applications 612 and/or 614. Thus, user 616 might log on to software application 612 and identify their self with their unique address on blockchain 610. In response, software application 612 might determine whether this address holds any NFTs that can be used to control access to unlockable features of software application 612 (e.g., NFT 606A). If so, user 616 is granted access to these features (i.e., the one or more features are unlocked). If not, the unlockable features of software application 612 remain locked for user 616.

B. Example Transactions

FIGS. 7A, 7B, 7C, and 7D are message flow diagrams depicting transactions between the components of FIG. 6 in accordance with example embodiments. Nonetheless, other transactions are possible involving these and/or other components.

Figure 7A:
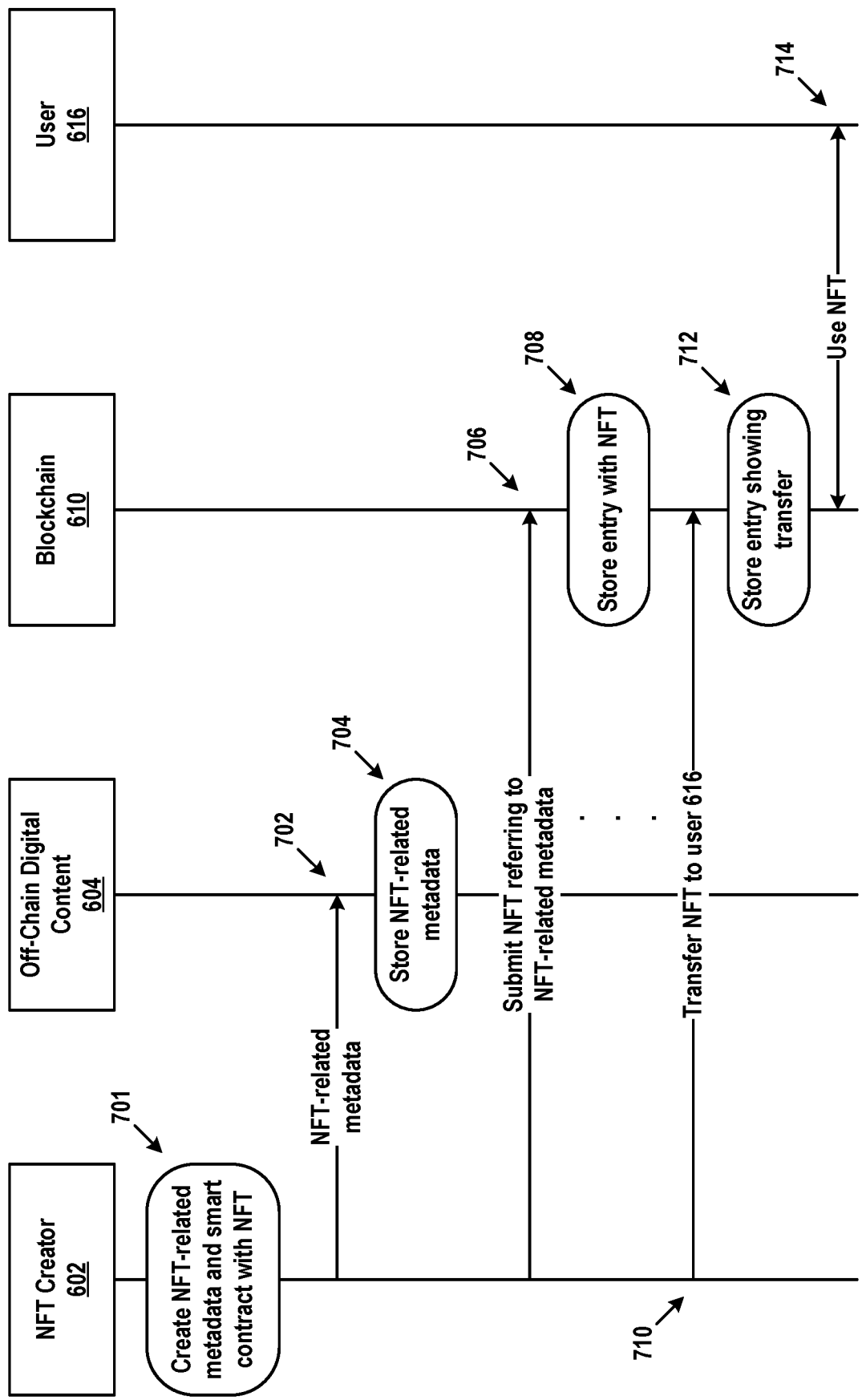

FIG. 7A involves NFT creator 602, off-chain digital content 604, blockchain 610, and user 616, but more or fewer components and/or entities may be involved. FIG. 7A depicts one possible way in which NFT creator 602 can mint an NFT, deploy this NFT to blockchain 610, and transfer the NFT to user 616. Other ways of achieving these goals may be possible. Herein, it is assumed that the NFT grants access to or unlocks a feature of one or more software applications for the holder. As noted, NFT creator 602 may be one of software manufacturer 612A or software manufacturer 614A.

At step 701, NFT creator 602 creates NFT-related metadata (e.g., NFT-related metadata 606B) as well as a smart contract with an NFT (e.g., NFT 606A). At step 702, NFT creator 602 transmits the NFT-related metadata to off-chain digital content 604. At step 704, off-chain digital content 604 stores the NFT-related metadata.

At step 706, NFT creator 602 submits the smart contract with the NFT (here, referred to as just the "NFT" for simplicity) to blockchain 610. This may result in blockchain miners and/or nodes mining this proposed entry, along with other entries, into a block that is added to blockchain 610. Thus, at step 708, an entry with the NFT is stored on blockchain 610.

As indicated by the ellipsis, at some point in time (e.g., minutes, hours, days, or weeks) after step 706, step 710 may involve transferring the NFT to user 616. Doing so may involve NFT creator 602 adding an entry to blockchain 610 indicating that user 616 holds the NFT. For instance, NFT creator 602 may provide the NFT to user 616 in response to a request from user 616, in response to receiving some form of compensation from user 616 (e.g., fiat currency, cryptocurrency, or another NFT), or for free as a gift. Regardless, step 712 may involve blockchain 610 storing an entry showing the transfer of the NFT from NFT creator 602 to user 616.

Step 714 represents user 616 making use of the NFT. This may involve user 616 providing proof that they hold the NFT, so that user 616 is able to unlock and access a feature of a software application.

To that point, FIG. 7B involves software application 612, off-chain digital content 604, blockchain 610, and user 616, but more or fewer components and/or entities may be involved. FIG. 7B depicts one possible way in which user 616 can employ an NFT to unlock or access to a feature of software application 612. Other ways of achieving this goal may be possible. It is assumed that the steps of FIG. 7B follow those of FIG. 7A and that user 616 still holds the NFT (i.e., blockchain 610 indicates that the NFT has been transferred to user 616 and that user 616 has not subsequently transferred the NFT to another entity).

At step 720, user 616 provides software application 612 with a request to unlock a feature with the NFT. This feature may be one of one or more that are preconfigured to be unlocked by way of the NFT. The feature could also be unlocked by other NFTs, so this NFT provides either exclusive or non-exclusive access to the feature.

As an example, user 616 may log on to software application 612 and select an option to unlock the feature. Alternatively, user 616 may select an option to use an NFT to unlock features in general. In response to a prompt from software application 612, user 616 may enter their address identifier for blockchain 610 and/or the NFT's unique identifier on blockchain 610 (e.g., the NFT's token identifier and its smart contract address).

In response, at step 722, software application 612 may access blockchain 610 to verify that the NFT is held by user 616. This may involve scanning through entries of the blockchain to determine that: (i) user 616 is the current holder of the NFT, and/or (ii) there is a proper chain of ownership from the creator of the NFT (NFT creator 602) to user 616. Determining that user 616 is the current holder of the NFT may include determining that there is an entry on blockchain 610 establishing that user 616 holds the NFT and that user 616 did not subsequently transfer the NFT to another party.

At step 724, software application 612 may obtain the NFT-related metadata from off-chain digital content 604. This metadata may identify the feature to software application 612 in a non-ambiguous fashion. As indicated by the dashed line, step 724 is optional, as the NFT itself may be used to identify the feature.

At step 726, software application 612 may provide a confirmation that the feature has been unlocked to user 616. Thus, at step 732, user 616 may access the unlocked feature when using software application 612.

Steps 728 and 730 are optional, as indicated by their dashed lines. At step 728, software application 612 may submit an entry to blockchain 610 with an indicator that the NFT is being used with software application 612. This may result in blockchain miners and/or nodes mining this proposed entry, along with other entries, into a block that is added to blockchain 610. Thus, at step 730, an entry with the indicator is stored on blockchain 610. This allows software application 612 to notify any interested parties that it is using the NFT. In some cases, this may prevent user 616 from simultaneously using the NFT to gain access to locked features on other software applications. In some cases, this entry may be submitted by user 616 and checked by software application 612, or digitally signed by both user 616 and software application 612 to indicate that both user 616 and software application 612 agree that the NFT is being used with software application 612.

Figure 7C:
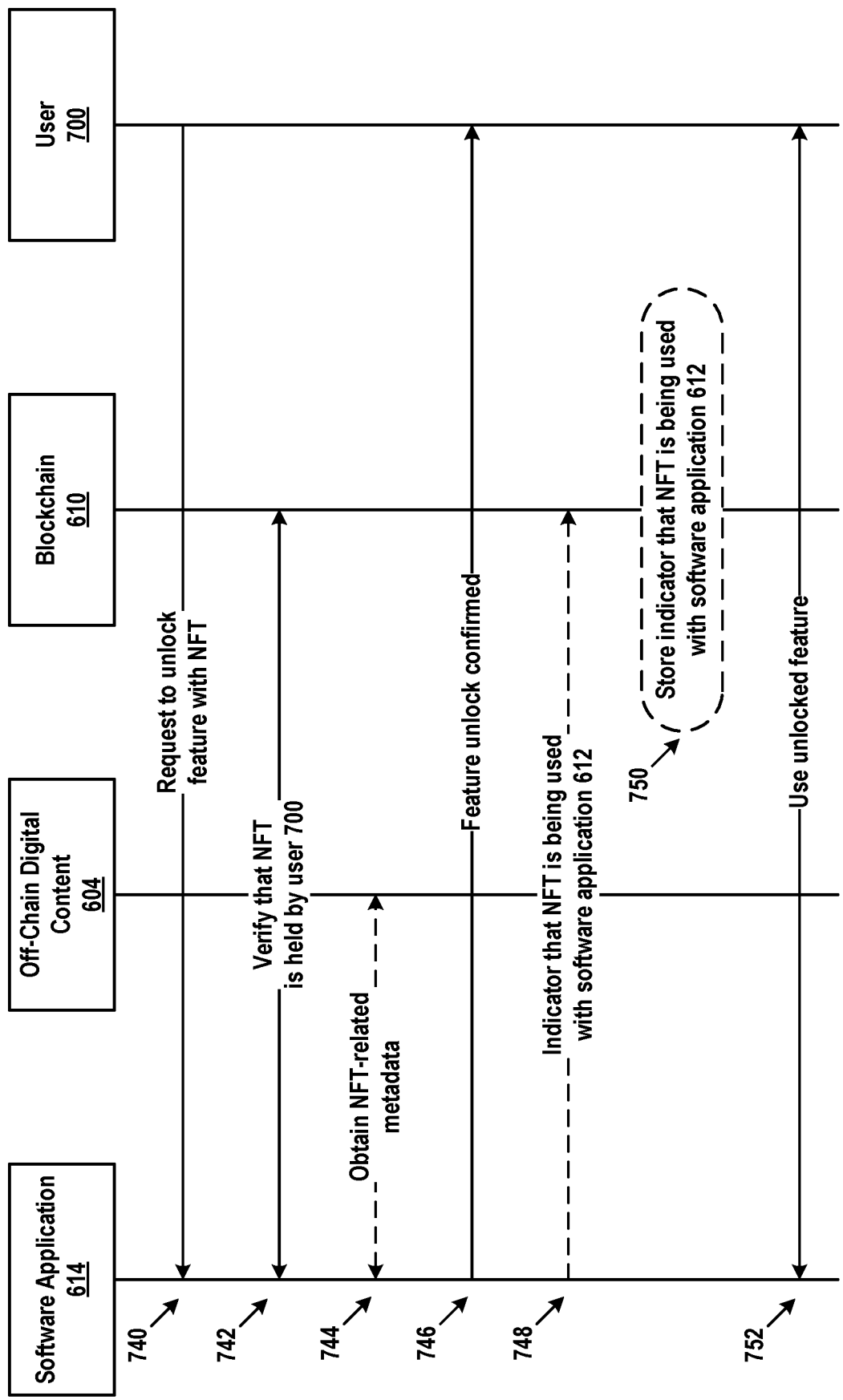

FIG. 7C depicts a transaction that is conceptually similar to that of FIG. 7B, but assumes that the NFT has been transferred from user 616 to user 700, and that user 700 wants to use the NFT to unlock a feature of software application 614. The transfer is not shown, but would be analogous to steps 710 and 712.

Thus, FIG. 7C involves software application 614, off-chain digital content 604, blockchain 610, and user 700, but more or fewer components and/or entities may be involved. It is assumed that the steps of FIG. 7C follow those of FIG. 7B, but that user 700 holds the NFT.

At step 740, user 700 provides software application 614 with a request to unlock a feature with the NFT. This feature may be one of one or more that are preconfigured to be unlocked by way of the NFT. The feature could also be unlocked by other NFTs, so this NFT provides either exclusive or non-exclusive access to the feature.

In response, at step 742, software application 614 may access blockchain 610 to verify that the NFT is held by user 700. This may involve scanning through entries of the blockchain to determine that: (i) user 700 is the current holder of the NFT, and/or (ii) there is a proper chain of ownership from the creator of the NFT (NFT creator 602) to user 700 (e.g., from NFT creator 602 to user 616 and then to user 700). Determining that user 700 is the current holder of the NFT may include determining that there is an entry on blockchain 610 establishing that user 700 holds the NFT and that user 700 did not subsequently transfer the NFT to another party.

At step 744, software application 614 may obtain the NFT-related metadata from off-chain digital content 604. This metadata may identify the feature to software application 614 in a non-ambiguous fashion. As indicated by the dashed line, step 744 is optional, as the NFT itself may be used to identify the feature.

At step 746, software application 614 provides a confirmation that the feature has been unlocked to user 700. Thus, at step 752, user 700 may access the unlocked feature when using software application 614.

Steps 748 and 750 are optional, as indicated by their dashed lines. At step 748, software application 614 may submit an entry to blockchain 610 with an indicator that the NFT is being used with software application 614. This may result in blockchain miners and/or nodes mining this proposed entry, along with other entries, into a block that is added to blockchain 610. Thus, at step 750, an entry with the indicator is stored on blockchain 610. This allows software application 614 to notify any interested parties that it is using the NFT. In some cases, this may prevent user 700 from simultaneously using the NFT to gain access to locked features on other software applications. In some cases, this entry may be submitted by user 616 and checked by software application 614, or digitally signed by both user 616 and software application 614 to indicate that both user 616 and software application 614 agree that the NFT is being used with software application 614.

To that end, users holding an NFT may be required to explicitly revoke their access to a feature (e.g., thus locking a feature that was unlocked for the user) before using the NFT to unlock an analogous feature of a different software application.

FIG. 7D depicts an example transaction of this process. FIG. 7D involves software application 612, software application 614, blockchain 610, and user 700, but more or fewer components and/or entities may be involved. For example, possible interactions with off-chain digital content 604 are omitted for purposes of simplicity. It is assumed that the steps of FIG. 7D follow those of FIG. 7C, and that user 700 still holds the NFT. It is further assumed that blockchain 610 contains an indicator that the NFT is being used with application 614 to unlock a feature thereof, and that no subsequent indicator of the NFT's use by another software application exists on blockchain 610.

At step 760, user 700 provides software application 612 with a request to unlock the feature with the NFT. In response, at step 762, software application 612 may access blockchain 610 to verify that the NFT is held by user 700 (using a process to do so as described above) and is not being used by another software application. The latter may involve verifying that there is no entry on blockchain 610 indicating that the NFT is being used with another software application unless a later entry on blockchain 610 indicates that the NFT is being used with software application 612.

As noted, the NFT is being used with software application 614. Therefore, the verification of step 762 fails, and at step 764 software application 612 informs user 700 that the feature unlock request is denied.

At step 766, in order to address this situation, user 700 provides a request to software application 614 to revoke access to the feature. In response, at step 768, software application 614 verifies that the NFT is held by user 700. This verification step may involve a process analogous to those discussed above. Since user 700 does hold the NFT, at step 770, software application 614 informs user 700 that access to the feature has been revoked. A further step that is not shown may involve software application 614 and/or user 700 submitting an entry or entries to blockchain 610, with the entr(ies) indicating that the NFT is no longer being used with software application 614.

Now that this is the case, user 700 can request unlocking of the feature by software application 612. To that end, at step 772, user 700 provides software application 612 with another request to unlock the feature with the NFT. In response, at step 774, software application 612 may access blockchain 610 to verify that the NFT is held by user 700 and is not being used by another software application. Since this is true, the verification of step 774 succeeds, and at step 776 software application 612 informs user 700 that the feature unlock request is granted. Afterward, user 700 may use the feature with software application 612.

Advantageously, these embodiments allow an NFT to unlock one or more features of a given software application, while preventing the user from using the NFT to simultaneously unlock analogous features of another software application. In alternative or additional embodiments, such simultaneous use may be permitted.

Regardless, these embodiments allow both software applications 612 and 614, which were developed, deployed, and/or operated by different entities, to support similar features that can be unlocked by the same NFT. Further, the NFT creator may be one of these entities or a different entity, and the blockchain may be operated by one of these entities or a different entity. Such an arrangement provides increased flexibility, as control over access to features does not lie entirely with the software manufacturers.

Various options are possible. For instance, software application 612 and/or 614 may cache the locked/unlocked status of each feature on a per user basis for some period of time. During this period, if a user attempts to access feature of such a software application that is unlocked for the user, the software application may refrain from querying blockchain 610 to confirm permission to access the feature.

As noted above, a software application may identify the feature for which access is being sought either when a user requests that the feature is unlocked or by querying off-chain digital content after verifying that the NFT is held by the user. In the former case, the software application may be programmed with a list of NFTs (each specified, e.g., by their smart contract address and unique token identifier) that it accepts, and will compare the NFT provided in the request with this list in order to determine whether the NFT will be honored. If the NFT does not appear in the list, it cannot be used to unlock features of the software application. Alternatively, the NFT-related metadata for the NFT may contain a string or code that specifies the feature in some other format (e.g., a text string such as "Feature F1.2"), and the software application can use this string to identify the feature.

Also as noted above, blockchain 610 could be a private blockchain that is used just by a limited number of software applications, such as software application 612 and/or 614. Alternatively, blockchain 610 could be a public blockchain useable by any software application that is capable of locking/unlocking features by way of NFTs.

IV. EXAMPLE NFT-BASED EMBODIMENTS

The framework described in the context of FIGS. 6, 7A, 7B, 7C, and/or 7D may be used in a variety of ways. Some possible embodiments are described in this section.

A. Limited-Time NFTs

A limited time NFT is one in which the capability associated with the NFT (which is available to the user who holds the NFT) exists only for a limited period of time. For example, when an NFT creator mints an NFT, it may specify (within the NFT or in associated metadata) that the NFT is only valid for a specific period of time (e.g., 1 hour, 6 hours, 12, hours, 1 day, 3 days, 5 days, 7 days, 14, days, 30 days, etc.). This period of time may begin to run from the time of the NFT's creation, its initial placement on a blockchain, a predetermined beginning time (e.g., midnight, Mar. 14, 2022), or when triggered by the condition of a smart contract being satisfied. Once the period of time passes, the NFT is considered expired and can no longer be used for its intended purpose (e.g., unlocking features of a software application).

A user holding a limited-time NFT that has not yet expired has the following options. They can use the NFT for its intended purpose, or transfer the NFT to another user. In some cases, the NFT may have some pre-defined value that can be redeemed when the NFT is burnt before it expires. If the token expires before it is burnt, this value may be returned to the NFT creator.

Thus, when a software application receives a request to use a limited-time NFT, the software application may (among other validations) determine whether the NFT has expired. If the NFT has not expired, the software application may honor the NFT as described above, granting the user access to one or more otherwise features. If the NFT has expired, the request may be denied. Similarly, burning the NFT after it has expired might not result in any value being redeemed by the user who burnt the NFT.

Herein, burning an NFT may involve transferring the NFT to a pre-defined address on the blockchain used for burning (e.g., an all-zero or null address). Once burnt in this fashion, the NFT is no longer in circulation, and cannot be transferred between users and/or entities. While a record of a burnt NFT's existence is maintained on the blockchain, by convention the NFT cannot be used. Thus, burning an NFT is effectively irreversible.

In some cases, a pre-defined value of the NFT can vary over time. For example, it may decrease linearly from the time of its creation until the time of its expiry, so that the value is zero or null as it expires.

This embodiment has the advantage of controlling the operation of the software application and the NFT so that the NFT can only be used for a specific period of time. This prevents large numbers of usable NFTs from existing on the blockchain indefinitely.

The ERC-721 specification of an NFT may be modified to support these feature through the introduction of the three API calls in Table 1. Notably, these API calls are just examples; other parameters may be used and further API calls may be added.

or may change. In the latter case, the log file may also be based on randomly-generated events, network traffic, or other input. In some embodiments, the log file may be summarized in some fashion, such as by supplying it to a hash function to product the output used with the NFT.

Regardless, output from a software application is assumed to be stored, e.g., as off-chain digital content. Then, an NFT may refer to this output, e.g., by way of its metadata. This NFT may be previously existing or newly minted. As with other NFTs discussed herein, this NFT can be transferred between entities. Thus, the blockchain tracks which entity currently holds the NFT. Transferring an outcome NFT may result in the transferee providing the transferor with something of commensurate value in return. Similar to the embodiments discussed above, burning an outcome NFT may result in the burning entity redeeming the NFT for a predefined or variable value.

An outcome NFT can be used to prove that a particular software application was executed and that in response it generated a particular result. Therefore, the NFT could represent a test result, a certification, proof of attendance, proof of use, and/or the completion of an arbitrary task by way of the software application. Other possibilities exist.

C. Example Operations

Figure 8:
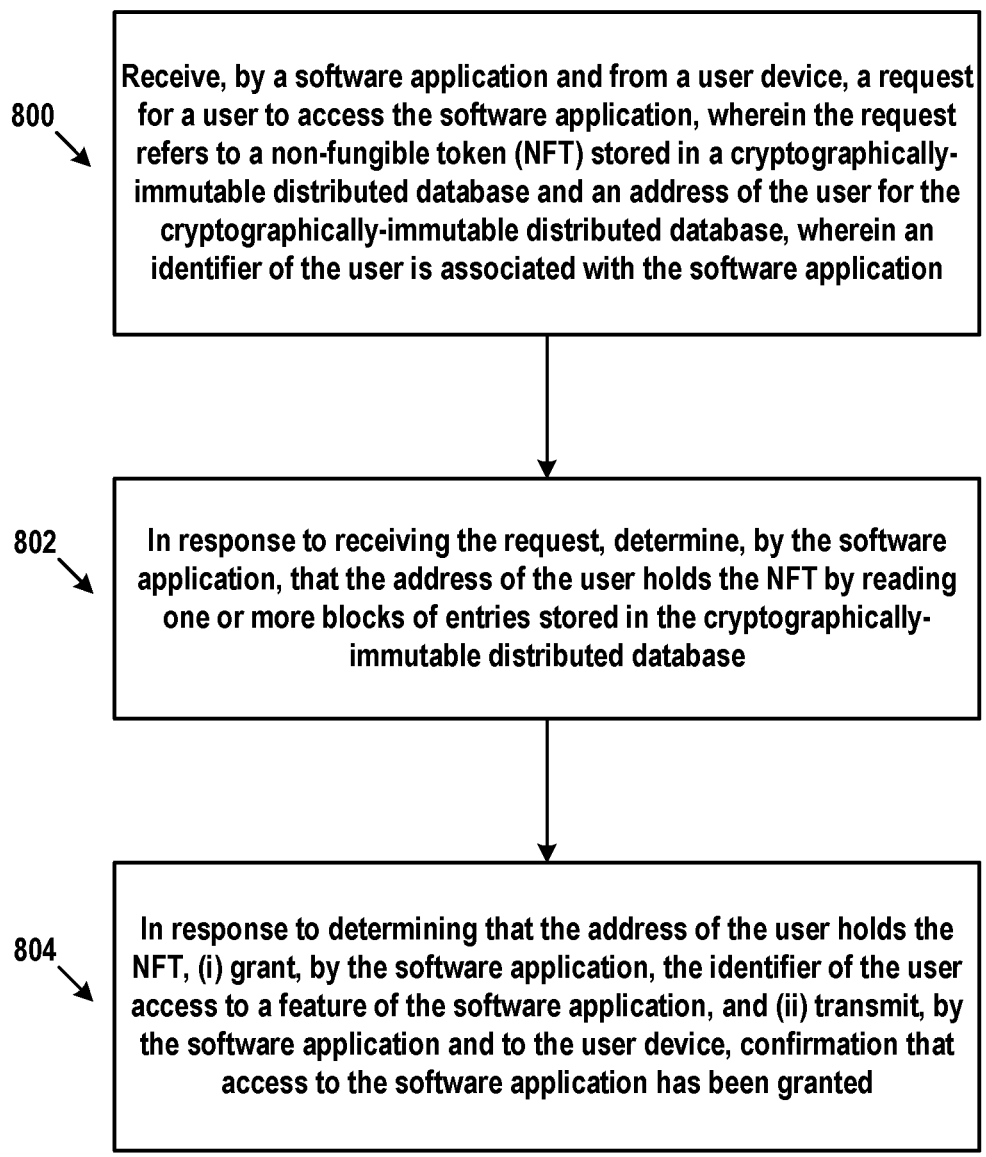
FIG. 8 is a flow chart, in accordance with example embodiments.

FIG. 8 is a flow chart illustrating an example embodiment. The operations illustrated by FIG. 8 may be carried out by a computing system or computing device that includes a software application configured to grant users access to features based on NFTs. Non-limiting examples of the computing system or computing device include computing device 300 or server cluster 400, for example. However, the operations can be carried out by other types of devices or device subsystems. For example, the operations could be carried out by a portable computer, such as a laptop or a tablet device.

The embodiment of FIG. 8 may be simplified by the removal of any one or more of the features shown therein. Further, this embodiment may be combined with features, aspects, and/or implementations of any of the previous figures or otherwise described herein. Such an embodiment may include instructions executable by one or more processors of the one or more server devices of the system or virtual machine or container. For example, the instructions

TABLE 1

| API call | Functionality |
|---|---|
| function addValue(address __Address, uint256 __Value, uint256 __ValidFor); | Adds __Value to the NFT referenced by __Address, where the NFT or __Value expires after __ValidFor seconds). |
| event Burnt (address __Address, uint256 __tokenId); | Emits when the entity of __Address burns the NFT referenced by __tokenId. |
| event Expiry (uint256 __tokenId); | Emits when the NFT referenced by __tokenId expires. |

B. Outcome NFTs

An outcome NFT is one that encodes the outcome of one or more operations of a software application. This outcome might be consider to be held with the NFT by a user, and may later be used in various ways. For example, a software application may generate a log file and store it (or metadata that references it) as off-chain digital content. The log file may represent evidence that the software application was executed with certain input parameters and produces a certain corresponding result (e.g., part or all of the log file may be digitally signed by the software application). When the input parameters are the same on subsequent executions of the one or more operations, the log file may be identical may take the form of software and/or hardware and/or firmware instructions. In an example embodiment, the instructions may be stored on a non-transitory computer readable medium. When executed by one or more processors of the one or more servers, the instructions may cause the one or more servers to carry out various operations of the embodiment.

Block 800 involves receiving, by a software application and from a user device, a request for a user to access the software application, wherein the request refers to an NFT stored in a cryptographically-immutable distributed database and an address of the user for the cryptographically-immutable distributed database, wherein an identifier of the user is associated with the software application.

Block 802 involves, possibly in response to receiving the request, determining, by the software application, that the address of the user holds the NFT. This is accomplished by reading one or more blocks of entries stored in the cryptographically-immutable distributed database.

Block 804 involves, in response to determining that the address of the user holds the NFT, (i) granting, by the software application, the identifier of the user access to a feature of the software application, and (ii) transmitting, by the software application and to the user device, confirmation that access to the software application has been granted.

In some embodiments, the request also identifies the feature.

In some embodiments, the NFT contains a reference to metadata in digital content storage, wherein the metadata is related to the NFT and identifies the feature, and wherein the digital content storage is separate from the cryptographically-immutable distributed database. These embodiments may further involve: in response to determining that the address of the user holds the NFT, obtaining, by the software application and using the reference, the metadata from the digital content storage; and determining, by the software application, the feature from the metadata.

Some embodiments may further involve, in response to determining that the address of the user holds the NFT, submitting, by the software application, an entry for the cryptographically-immutable distributed database, wherein the entry indicates that the NFT is being used by the software application.

In some embodiments, the entry is digitally signed by one or more of the software application or the user.

Some embodiments may further involve: receiving, by the software application and from a second user device, a second request for a second user to access the software application, wherein the second request refers to the NFT and a second address of the second user for the cryptographically-immutable distributed database; in response to receiving the second request, determining, by the software application, that the second address of the second user does not hold the NFT by reading one or more further blocks of entries stored in the cryptographically-immutable distributed database; and in response to determining that the second address of the second user does not hold the NFT, transmitting, by the software application and to the second user device, denial of access to the software application.

Some embodiments may further involve: receiving, by the software application and from a second user device, a second request for a second user to access the software application, wherein the second request refers to the NFT and a second address of the second user for the cryptographically-immutable distributed database; in response to receiving the second request, determining, by the software application, that the second address of the second user holds the NFT by reading one or more further blocks of entries stored in the cryptographically-immutable distributed database; in response to determining that the second address of the second user holds the NFT, determining, by the software application, that the NFT is being used by a second software application that is different from the software application; and in response to determining that the NFT is being used by the second software application, transmitting, by the software application and to the second user device, denial of access to the software application.

Some embodiments may further involve allowing, by the software application, the user to access the feature by way of the user device or another device.

In some embodiments, the cryptographically-immutable distributed database comprises a blockchain.

Some embodiments may further involve prior to the request for the user to access the software application, (i) minting the NFT, and (ii) submitting the NFT in an entry for the cryptographically-immutable distributed database.

In some embodiments, the NFT comprises an expiry time after which the NFT can no longer be used to obtain access to the software application.

In some embodiments, the expiry time is calculated from when the NFT was created, when the NFT was initially placed in the cryptographically-immutable distributed database, a predetermined starting time, or when a condition of a smart contract was satisfied.

In some embodiments, the NFT is associated with a predefined value that changes between when the NFT is created and the expiry time.

In some embodiments, the NFT is transferrable from the user to another entity.

In some embodiments, the NFT can be burnt by the user for a redemption value.

In some embodiments, the NFT is associated with further metadata that represents an outcome of the software application or proof that the software application generated the outcome.

Some embodiments may further involve, possibly in response to receiving the request, determining, by the software application, that the feature is supported by the software application.

In some embodiments, a second feature analogous to the feature is supported by a second software application, and wherein the NFT can be used to grant access to the second feature in the second software application.

In some embodiments, the feature is either locked or unlocked on a per-user basis, and wherein granting the identifier of the user access to the feature comprises unlocking the feature for the identifier of the user.

V. EXAMPLE GAMING EMBODIMENTS

In some example embodiments, a computing system (e.g., computing device 300 and/or server cluster 400) may operate a software application that provides the user with gameplay. The type of game can vary, and can be puzzle-based, word-based, real-time strategy, combat-based, role playing, simulation, sports-based, adventure, or wagering just to name a few examples. The gaming embodiments described herein focus on wagering games, such as reel-based games, dice games, card games, as possibilities. For purposes of illustration, reel-based games are described in detail, but the discussion thereof can be applied to other types of wagering and non-wagering games. In particular, blockchain-based technology can be used to grant users access to features of such a game in the fashion described above, with variations provided in this section.

Users may interact with a wagering game by way of a client/server model. Thus, the wagering game may execute entirely or largely on a server computing system (e.g., computing device 300 and/or server cluster 400) and the user may access the wagering game by way of a web browser on their client device (e.g., laptop computer, desktop computer, tablet, or mobile phone), for example. Other embodiments involve the wagering game requiring users to download and execute client software on the client device.

This client software interacts with the server-based software to facilitate gameplay. Here, the "software application" described above may encompass the client software and/or the server-based software, and these components may be referred to collectively as a "gaming software application".

Such a gaming software application typically requires a user to provide items of value (e.g., physical cash, tokens, credit, or cryptocurrency) to the gaming software application in order to play wagering games. Once these items of value are in possession of the gaming software application, the gaming software application may convert these items into some form of internal credit balance that allows the user to play a certain number of wagering games and/or for a certain period of time. The gaming software application may also allow the user to transfer some or all of their credit balance from the gaming software application back into a form usable by the user outside of the gaming software application (e.g., physical cash, tokens, credit, or cryptocurrency).

The outcomes of such wagering games may be determined at least partially on the outcome of a random number generator (RNG), as well as possibly on user input as well. Other factors may also be considered. Thus, if the user is lucky with their wagers, their credit balance may grow over time. If the user is unlucky, their credit balance may decrease over time.

In various alternatives, software interfaces (e.g., graphical user interface screens and/or communication software) may facilitate the transfer of cryptocurrency from user to the gaming software application and vice-versa. For example, graphical user interface screens may provide a blockchain address of the gaming software application (e.g., in the form of a bar code or QR code for scanning by the user's mobile phone, or a typed in address) and instruct the user on how to transfer cryptocurrency from the user's blockchain address to the gaming software application. Then, the user can do so by way of their mobile phone, using typical blockchain interactions that do not need to involve the gaming software application.

Likewise, additional graphical user interface screens may prompt the user to provide their blockchain address (e.g., displaying it in the form of a bar code or QR code on their mobile phone for a scanner associated with the gaming software application or typing it in). In response, the gaming software application may transfer some or all of the user's balance to the user's cryptocurrency address using typical blockchain interactions.

A further embodiment may involve a dedicated machine (i.e., a computing device in a console for example) that executes the client software and possibly part or all of the server-based software to facilitate gameplay. This may be a standalone device that includes an acceptor of a physical item associated with a monetary value, such as a paper money acceptor, coin acceptor, or a card reader. This acceptor may include a validator configured to identify the physical item, and determine whether the physical item is suitable as payment to the machine. In some examples, such a machine may also physically dispense a corresponding payout (e.g., cash), or otherwise facilitate the payout to the player (by adding funds to an electronic account associated with a gaming card). Such an activity may be triggered by a cash-out button either on the machine's display or elsewhere on the machine.

Regardless of these interfaces and operations related to credit balance, a reel-based game (as an example of a wagering game) may exhibit various characteristics and features. In general, reel-based games display symbols on "spinnable" reels, typically in a matrix arrangement with some number of columns and some number of rows (see FIG. 11 for an example of a matrix with 5 columns and 3 rows). Each "spin" of the reels results in an RNG being used to determine, at least in part, the symbols to be displayed. Such a spin may reduce the user's credit balance by some amount (the user's wager) unless the spin has been awarded for free.

During and/or after a spin, the gaming software application may display an animation of the reels being spun or some other representation of the symbols thereon changing, ultimately resulting in a new pattern of symbols being displayed as a result of the spin. Certain pre-defined patterns of symbols may represent winning outcomes that involve payouts to the user (e.g., increasing the user's credit balance). These payouts may be more or less than the user's wager. Non-winning outcomes generally do not increase the user's credit balance, and therefore result in a net loss of the user.

Within the gaming software application, a global symbol group for a reel-based game may include multiple symbols, such as a WILD, an ace, a king, a queen, a jack and a ten, which may be used in connection with the outcome. The ace, king, queen, jack, and ten symbols can represent symbols found on a standard deck of playing cards. The WILD symbol may have special properties that allow it to form winning combinations with other symbols.

However, such a global symbol group may be customized with particular symbols as desired. As some possible examples, the symbols may include images of people, animals, dinosaurs, fanciful creatures, cartoon characters, inanimate objects, or other things in addition to or instead of WILD, ace, king, queen, jack, or ten symbols. Furthermore, WILD symbols may vary in design. Examples of some possible symbols are shown in the accompanying drawings (see FIG. 11).

Figure 9:
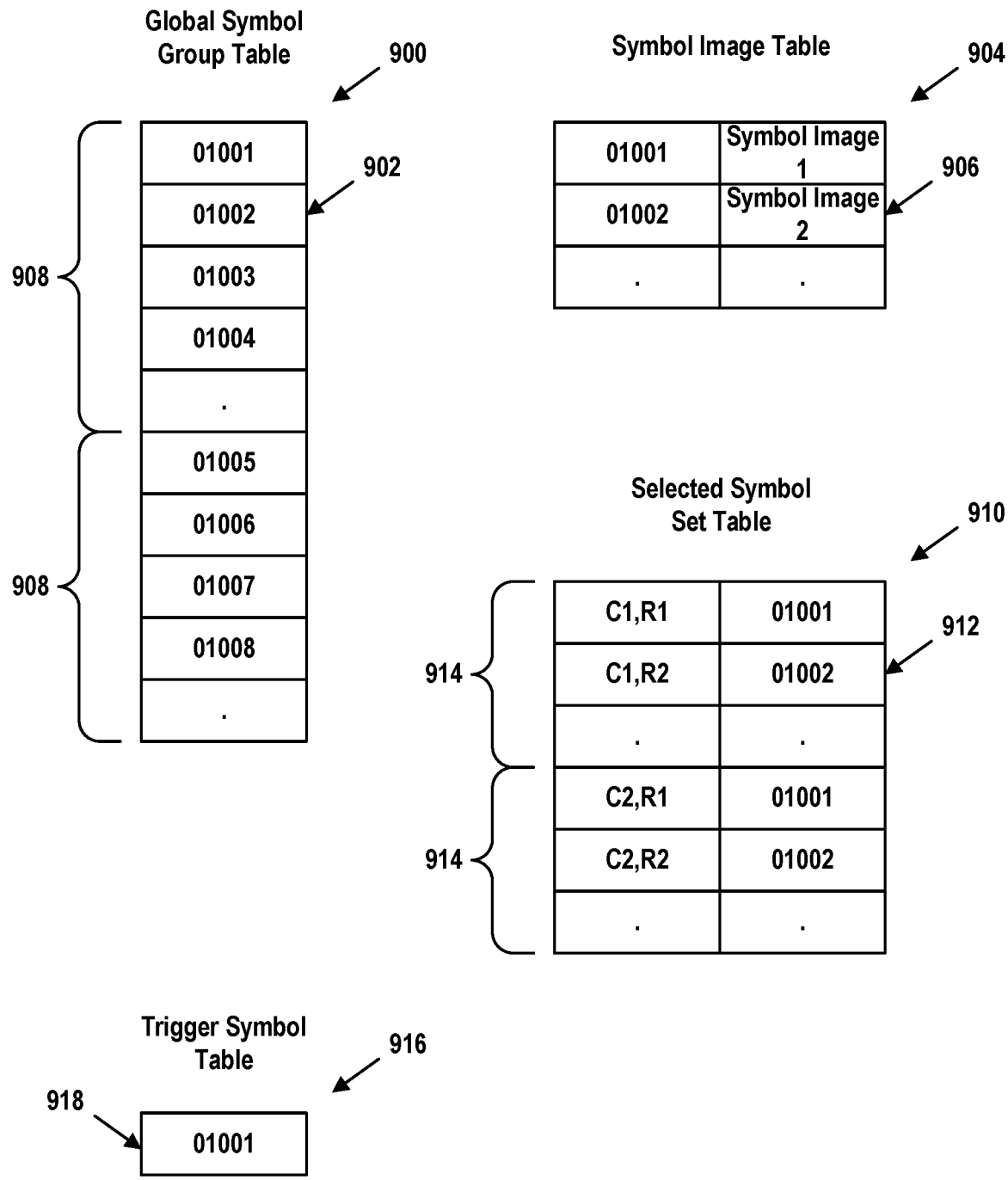
FIG. 9 depicts data structures for symbol storage, in accordance with example embodiments.

In one example, the global symbol group may be represented as a table (or other data structure) stored in memory accessible to the gaming software application. FIG. 9 shows an example global symbol group table 900. The global symbol group table 900 includes multiple records 902, each including an identifier (e.g., 01001, 01002, 01003, 01004, etc.) that represents a particular symbol. In one example, the global symbol group, and therefore the global symbol group table 900, may be divided into multiple sub-groups 908 as discussed in greater detail below.

The global symbol group table 900 may be used in connection with a symbol image table 904. The symbol image table 904 includes multiple records 906 (shown as distinct rows of table 904), each including an identifier that represents a particular symbol, and a corresponding displayable image. As such, the symbol image table 904 may be used to map an identifier in the global symbol group table 900 to a displayable image. Such an image may be arranged according to the Joint Photographic Experts Group (JPEG), Graphics Interchange Format (GIF), or Portable Network Graphics (PNG) encodings, for example.

During the course of a reel-based game, various symbol sets may be selected for display. Each selected symbol set may be stored in a table such as selected symbol set table 910. Selected symbol set table 910 includes multiple records 912 (shown as distinct rows in selected symbol set table 910), each record including an arrangement position of the symbol, and an identifier that represents the symbol. Thus, each symbol in the selected symbol set may correspond with a respective arrangement position in a reel-based display arrangement (e.g., both a column number and a row number in a column-and-row arrangement). As an example, C1,R1, shown in the selected symbol set table 910, represents a symbol position at column 1 (e.g., a left-most column of a plurality of columns in a symbol-display-portion of a display) and row 1 (e.g., a top row of a plurality of rows in a symbol-display-portion of the display). The column identifiers in selected symbol set table 910 (e.g., C1 and C2) can refer to columns in a symbol matrix or reels of a plurality of reels that can be spun. The selected symbols may be arranged into groups 914, each of which representing the selected symbols appearing on a particular reel.

In one example, the gaming software application may select the first symbol set by iterating through each record 912 in the selected symbol set table 910, and selecting a symbol identifier from among the symbol identifiers in the global symbol group table 900. In some examples, the symbol identifiers are numbers, and the gaming software application uses an RNG to select such numbers and, therefore, to select symbols randomly.

In some examples, the gaming software application may select each subset in the first symbol set from the corresponding sub-group in the global symbol group. This type of selection may be used when the symbol set represents one or more reels in a reel-type wager game. In this instance, each sub-group includes all the symbols of a given reel, and the selected sub-set includes the symbols of the reel that are "in play," namely those included in the selected symbol set.

In some examples, the selected symbol set may be partially restricted. For instance, the selected symbol set may include an instance of a predetermined symbol from the global symbol group, such as, for example, a WILD symbol. In another example, the predetermined symbol may be in a subgroup of global symbol group table 900 distinct from the subgroups from which symbols for the reels are selected.

As noted above, for each symbol in the selected first symbol set, the example embodiments can include the gaming software application randomly determining a corresponding arrangement position. As such, in an example where the arrangement is a column-and-row arrangement, the gaming software application may randomly determine a column identifier and a row identifier (from a set of potential column identifier and row identifier combinations) for each symbol in the selected first symbol set. In an example where the arrangement has symbol position identifiers (e.g., whole number 1 through 15, inclusive, as described above), the gaming software application may randomly select a symbol position identifier for each symbol in the selected first symbol set.

Where the column and row arrangement is used to simulate reels, the gaming software application may display the each subset in a corresponding column, such as by superimposing each subset over a virtual reel in a corresponding column. Thus, a sub-group 908 may represent an ordering of symbols on a particular reel.

Figure 10:
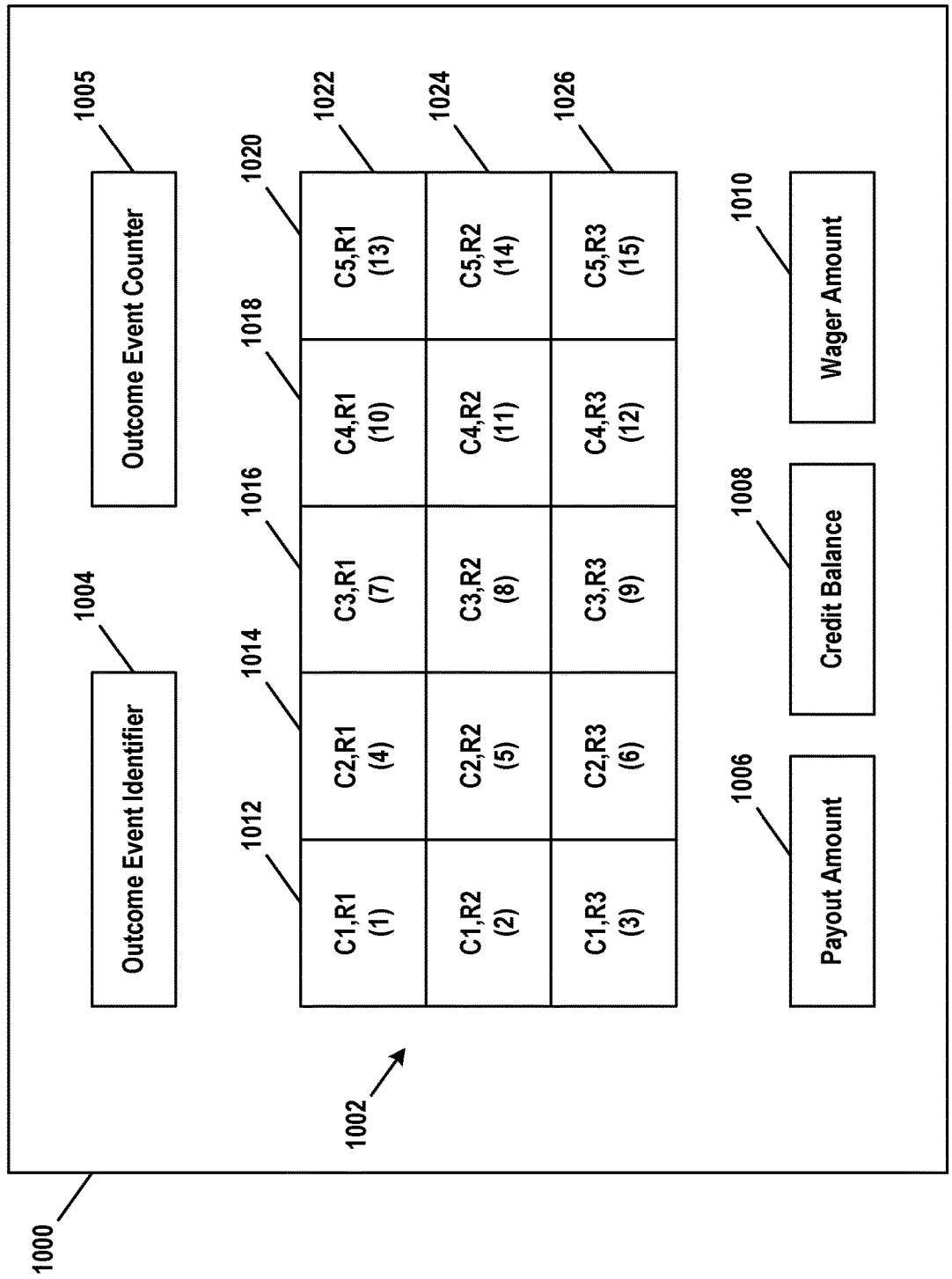
FIG. 10 depicts elements displayable by a computing device, in accordance with example embodiments.

FIG. 10 depicts a screenshot 1000 that the gaming software application can visually present (i.e., display). Screenshot 1000 includes a symbol-display-portion 1002, an outcome event identifier 1004, an outcome event counter 1005, a payout amount indicator 1006, a credit balance indicator 1008, and a wager amount indicator 1010.

Symbol-display-portion 1002 can include multiple symbol-display-segments and multiple symbol positions. As an example, the symbol-display-segments can include vertical symbol-display-segments 1012, 1014, 1016, 1018, and 1020 (or more simply, vertical SDSs 1012-1020). As another example, the symbol-display-segments can include horizontal symbol-display-segments 1022, 1024, and 1026 (or more simply, horizontal SDSs 1022-1026). Each symbol-display-segment can include multiple symbol positions. The vertical SDSs 1012-1020 are shown in FIG. 10 as having three symbol positions. The horizontal SDSs 1022-1026 are shown in FIG. 10 as having five symbol positions. These symbol-display-segments can be configured with different numbers of symbol positions than shown in FIG. 10.

The vertical SDSs 1012-1020 can be configured as spinnable reels. The processor of a machine or system displaying screenshot 1000 can display the spinnable reels spinning and stopped after spinning. For vertical SDSs 1012-1020, the spinnable reels may spin in a vertical direction (e.g., top to bottom or bottom to top, with respect to the symbol-display-portion 1002).

The horizontal SDSs 1022-1026 can be configured as spinnable reels. The processor of a machine or system displaying screenshot 1000 can display the spinnable reels spinning and stopped after spinning. For horizontal SDSs 1022-1026, the spinnable reels may spin in a horizontal direction (e.g., left to right or right to left, with respect to the symbol-display-portion 1002).

The gaming software application can cause symbol-display-segments to spin, and to cause spinning symbol-display-segments to stop spinning. The spinning and stopping of the spinning symbol-display-segments can be carried out for each outcome event. In accordance with the embodiments in which the symbol-display-portion 1002 includes columns or reels that spin from top to bottom or bottom to top, spinning the reels can include starting the spinning from a left-most column or reel to a right-most column or reel. Stopping the reels can occur using a similar sequence. Other sequences of spinning and stopping the spinning can be used. Moreover, the spinning or stopping of spinning of two or more columns or reels could occur simultaneously.

The multiple symbol positions in symbol-display-portion 1002 are identified by column and row designators, in which C1=column 1, C2=column 2, C3=column 3, C4=column 4, C5=column 5, R1=row 1, R2=row 2, and R3=row 3. The multiple symbol positions in symbol-display-portion 1002 are also identified by distinct numerical identifiers shown within parenthesis. C1 can be a first SDS. C2 can be a second SDS. C3 can be a third SDS. C4 can be a fourth SDS. C5 can be a fifth SDS. As shown in FIG. 10, C2 is between C1 and C3, C3 is between C2 and C4, and C4 is between C3 and C5.

For a matrix arrangement with 15 symbol positions as shown in FIG. 10, the numerical identifiers can be whole numbers 1 through 15, inclusive. The processors or machines described herein can be configured to select a symbol position of symbol-display-portion 1002 using a random number generator that is configured to generate a number within the range 1 through N, inclusive, where N equals the number of symbol positions in symbol-display-portion 1002. For the matrix arrangement, each symbol-display-segment can be a distinct column of the multiple columns within the matrix. Alternatively, for the matrix arrangement, each symbol-display-segment can be a distinct row of the multiple rows within the matrix.

The gaming software application can determine a state the machine or system is operating in or an outcome event that can occur during the determined state of the machine or system. In response to making that determination, the gaming software application can cause the outcome event identifier 1004 to display an identifier of the outcome event that can occur during the determined state. For example, the outcome event identifier can identify a base outcome event, a bonus outcome event, or another type of outcome event.

The bonus outcome event can be a "free spins" outcome event or some other outcome event.

The gaming software application can also determine: a wager amount placed on an outcome event; a payout amount after or during occurrence of an outcome event resulting in a win; a credit balance after or while decreasing a number of credits based on placement of a wager or after or while increasing a number of credits based on a determined payout amount; and a number of awarded remaining outcome events that can occur. The processor can cause: the determined wager amount to be displayed by the wager amount indicator 1010; the determined payout amount to be displayed by the payout amount indicator 1006; the determined credit balance to be displayed by the credit balance indicator 1008; and the number of awarded remaining outcome events to be displayed by the outcome event counter 1005.

Figure 11:
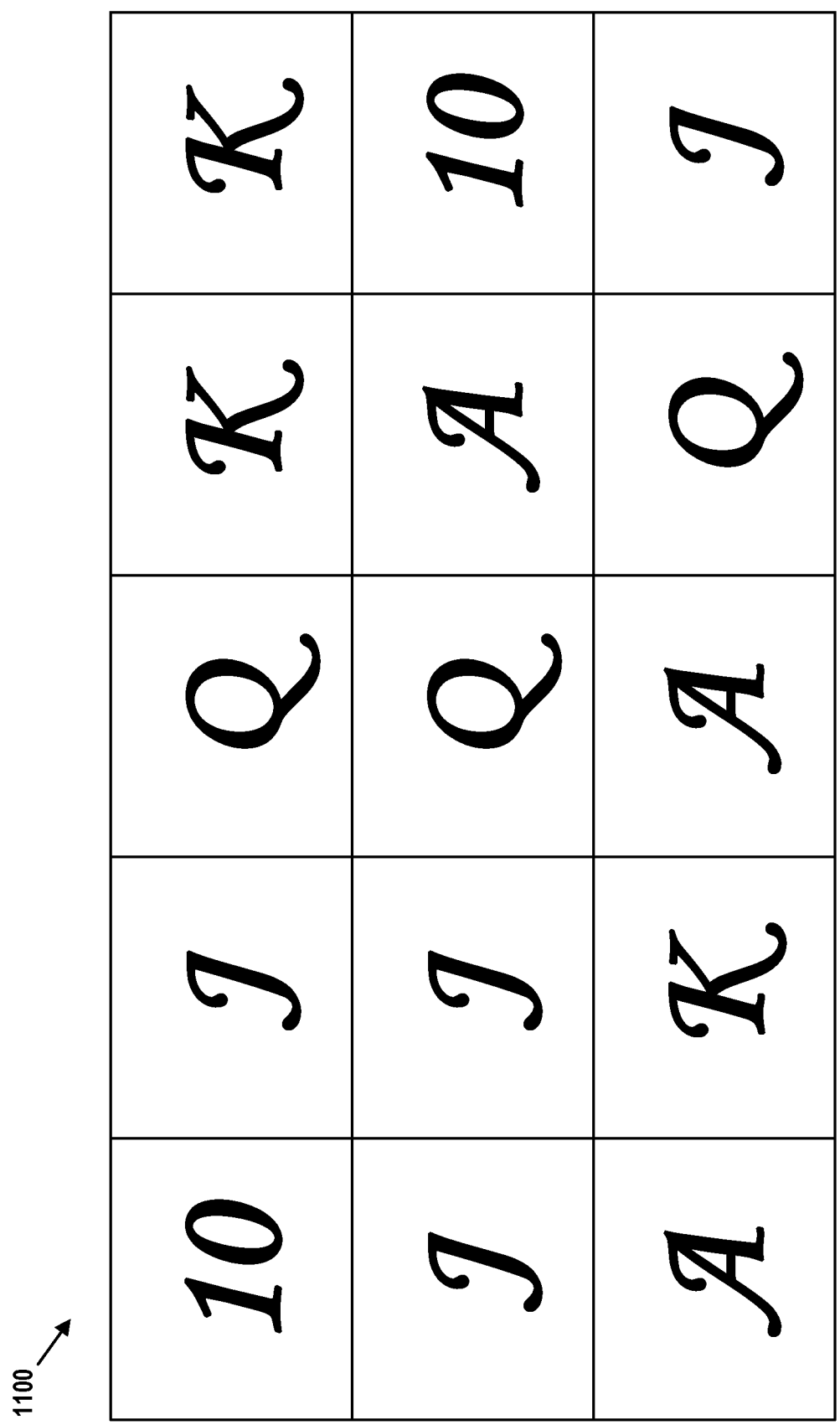
FIG. 11 depicts a selected symbol set in a display, in accordance with example embodiments.

FIG. 11 shows an example of a selected symbol set 1100 from the global symbol group for display during a base or bonus outcome event. The selected symbol set 1100 includes (i) symbol "10" at arrangement positions C1,R1 and C5,R2, (ii) symbol "J" at arrangement positions C2,R1, C1,R2, C2,R2, and C5,R3, (iii) symbol "Q" at arrangement positions C3,R1, C3,R2, and C4,R3, (iv) symbol "K" at arrangement positions C4,R1, C5,R1, and C2,R3, and (v) symbol "A" at arrangement position C4,R2, C1,R3, and C3,R3. Other arrangements of symbols, in terms of the number of columns, number of rows, or the layout of symbols, are possible. For example, WILD symbols may appear in any arrangement position.

A. Example Feature Framework

Not unlike the discussion above in the context of FIGS. 6-8, NFTs can be used to control user access to features within a gaming software application. These operations are largely analogous to those discussed for software applications in general. Therefore, unless stated otherwise, the disclosure of and surrounding FIGS. 6-8 applies to gaming software applications as well.

Figure 12:
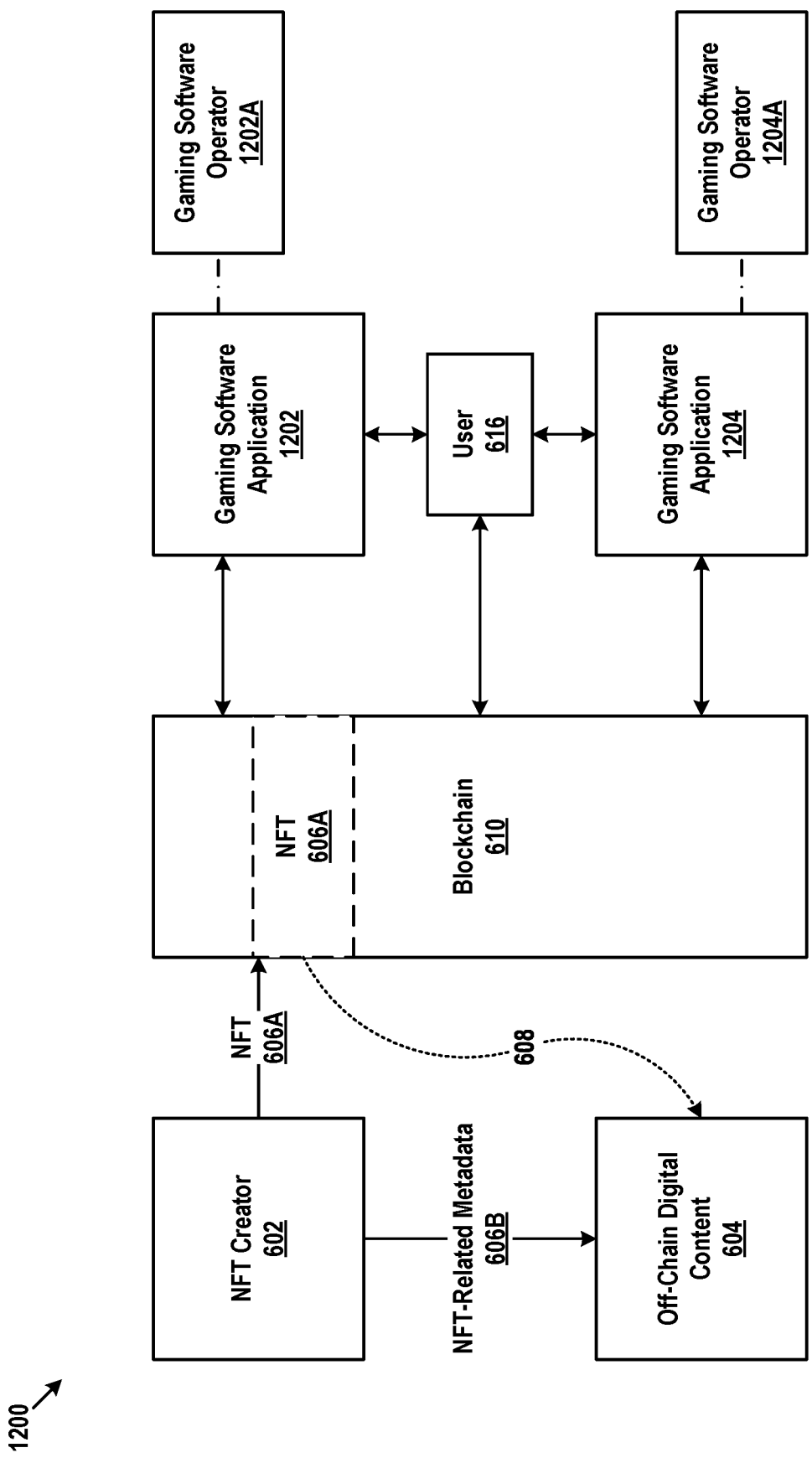
FIG. 12 provides an architecture for providing NFT-based access to features of gaming software applications, in accordance with example embodiments.

For avoidance of doubt, FIG. 12 is a variation on FIG. 6 with the software applications explicitly replaced by gaming software applications, and software manufacturers explicitly replaced by gaming software operators. All other components remain the same, and thus are presumed to operate in the same fashion as those in FIG. 6, albeit with any modification necessary to carry out the embodiments of this section.

Thus, architecture 1200 includes NFT creator 602, off-chain digital content 604, blockchain 610, gaming software application 1202, gaming software operator 1202A, gaming software application 1204, gaming software operator 1204A, and user 616. In various embodiments, more or fewer components and/or entities may be present.

As noted, blockchain 610 might be a public blockchain, accessible to anyone. In other cases, blockchain 610 might be a private blockchain that is only accessible to one or more of gaming software applications 1202 and 1204, one or more of gaming software operators 1202A and 1204A, and/or user 616.

Gaming software application 1202 may be a downloadable or non-downloadable set of one or more gaming software applications as described above. Likewise, gaming software application 1204 may be another downloadable or non-downloadable set of one or more gaming software applications. Both of gaming software applications 1202 and 1204 may provide gaming services to users, and may interface with blockchain 610 to look up and interact with feature-related NFTs.

Gaming software operator 1202A may be an entity that manufactures, owns, distributes, and/or operates gaming software application 1202. Similarly, gaming software operator 1204A may be an entity that manufactures, owns, distributes, and/or operates gaming software application 1204. In some cases, one or both of gaming software operator 1202A or gaming software operator 1204A may take on the role of NFT creator 602. Thus, gaming software operator 1202A may mint NFTs that can be used to control access to features of gaming software application 1202, and gaming software operator 1204A may mint NFTs that can be used to control access to features of software application 1204. Additionally, either gaming software operator (or another entity) may mint NFTs that can be used to control access to features of both of gaming software applications 1202 and 1204.

User 616 represents one or more individual users or entities that use either one or both of gaming software applications 1202 and 1204. User 616 may hold (own) one or more NFTs on blockchain 610 that control access to features of gaming software applications 1202 and/or 1204. Thus, user 616 might log on to gaming software application 1202 and identify their self with their unique address on blockchain 610. In response, gaming software application 1202 might determine whether this address holds any NFTs that can be used to control access to unlockable features of gaming software application 1202 (e.g., NFT 606A). If so, user 616 is granted access to these features (i.e., the one or more features are unlocked). If not, the unlockable features of gaming software application 1202 remain locked for user 616.

To be clear, the embodiments herein also contemplate there being only one or more than two gaming software applications. These gaming software applications may be provided by one or more gaming software operators.

The components of FIG. 12 may engage in any of the transactions described in the context of FIGS. 7A-7D, as well as any reasonable variations thereof. Figures representing such transactions would be identical or largely similar to FIGS. 7A-7D and therefore are omitted for sake of simplicity.

The features of a gaming software application controlled through use of NFTs can take various forms, including but not limited to: (i) general use of a gaming software application itself, (ii) access to a specific gaming software application of a suite of gaming software applications, (iii) access to a specific feature, functionality, or set of functionalities within a gaming software application, (iv) use of a gaming software application or feature thereof a certain number of times, and/or (v) use of a gaming software application or feature thereof for some period of time. Other possibilities exist, some of which are described below.

B. Value-Based NFTs

Value-based NFTs may be assigned or allocated a particular value, guaranteed by a creator or owner of the NFT. Such an NFT may be incorporated into an existing blockchain or a new blockchain may be created for the purpose supporting value-based NFTs.

An NFT creator may stake what they believe the NFT is worth (or, what they wish to guarantee its value as) at the time of creating the NFT. This value may exist for a limited time period or for an unlimited time period. One or more staked values may be applicable at a time, and such a value may be subject to specific rules. These rules may define time periods when a particular staked value is applicable (e.g., weekends only, or during certain hours of the day). The staked value may be in fiat currency, cryptocurrency, tokens, or some other form of credit or value.

The creator of the NFT may be required to supply a transaction fee for creating the NFT on the desired blockchain (e.g., in the form a cryptocurrency). When the creator or owner of the NFT chooses to stake a value on it, the blockchain storing the NFT may be notified that the owner has "staked" the specified value (e.g., through submission of a new entry). This may reserve the value staked on the NFT in a relevant cryptocurrency and does not allow the blockchain to modify this value unless otherwise notified.

Alternatively, a third-party system may reserve the funds internally on behalf of the creator/user staking such funds. The value of the NFT, as well as any other relevant information for this transaction, should be stored within the NFT metadata (e.g., within the NFT itself), or have some link to externally hosted metadata (e.g., NFT-related metadata stored in off-chain digital content. This metadata should be immutable to ensure that the agreement between the awarder and awardee cannot change once this token is issued.

As part of the NFT's attributes (possibly specified in metadata associated therewith, or linking to externally hosted metadata), a guaranteed value may be set along with, possibly, a guaranteed time of validity after which the value expires. Once the NFT has been transferred from the creator to another user, the user may choose to keep the NFT or exchange the NFT for items of value (e.g., cash, tokens, cryptocurrency).

The user may be required to exchange the NFT within the guaranteed time—exchanges of the NFT after expiry might not be allowed. Exchanging the NFT may involve providing it to the NFT's creator or a nominated third party, or may involve the user burning the NFT. The user will then be awarded the staked value of the NFT, in the currency reserved earlier, and the NFT creator may then choose to burn the NFT.

If the user has exchanged the NFT, and the currency was staked on the blockchain itself, a further entry submitted to the blockchain may contain a transaction from the NFT's creator to the user in the amount initially staked. If the NFT was not burned during the guaranteed time, the reserved currency may be released back to the NFT's creator.

In these examples, the NFT may be usable to access gaming software applications and/or features thereof as discussed herein. But use of the NFT in this manner is limited to the guaranteed time, after expiry of which the gaming software application may no longer honor the NFT. In other words, the gaming software application may check to determine whether an NFT is expired. If so, the NFT cannot be used to access the gaming software application or its features. Alternatively, the holder of the NFT may be permitted to use the NFT to access the gaming software application or one or more of it features by way of the NFT after it expires, but the NFT's staked value is returned to the NFT creator upon expiry.

Thus, in an example embodiment, an entity may reward a user with a newly-created NFT, this NFT having a value guaranteed by the entity. For purposes of example, this amount is assumed to be 1 ETH (one unit of cryptocurrency on the Ethereum blockchain). This 1 ETH will then be reserved only for use in association with the NFT. The user may receive the NFT as an award earned in a game, for example a wagering game. The user may then have a fixed time period, for example 7 days, in which they may choose whether or not they wish to keep the NFT, or if they want to receive the guaranteed value instead by burning the NFT. If the user wishes to keep the NFT, the 7 days may pass, after which the NFT may be used as appropriate. Alternatively, the user may burn the NFT to cash it in, and be awarded the reserved 1 ETH value thereof. If the user attempts to cash in the token after the period of time (7 days) expires, this may either not be allowed (this may be specified in the metadata of the NFT), or the user may not receive any reward if they do so (appropriate warnings may be provided to the user to prevent this). If the user does not burn the NFT within the guarantee time, the reserved 1 ETH may be returned to the NFT creator for future use.

In one possible implementation, a new blockchain is created that allows additional functionality to be added to the existing ERC-721 smart contract. This could allow additional data to be stored with the NFT or in associated off-chain metadata, as well as additional logic to be applied to these NFTs. For example, the NFT may have data fields "_Value" that stores the staked value, and "_ValidFor" which stores how long the staked value is valid (see Table 1). When the NFT creator decides to mint one of these NFTs, the NFT creator provides the _Value specified into the token. This value is held by the NFT either until either: (i) the NFT is burnt, causing the value to be transferred to the user or entity that burned the NFT, or (ii) the _ValidFor time has passed, after which the value is removed from the NFT and returned to the creator of the NFT. Such an NFT may by transferrable between users and/or entities until it is burnt.

In another embodiment, an NFT can be minted and submitted to any blockchain with additional metadata explicitly defining, or linking to information about, the value of the NFT. This value would be held by the NFT creator, and on completing the rules defined in the contract (i.e., proof of burn or transfer the NFT to a specified digital wallet), the NFT's holder is awarded the value defined previously. Although this method is less secure as it relies on the good faith of the NFT creator, it can operate with any blockchain supporting smart contracts.

In either embodiment, a varying value may also be provided, for example, where the staked value reduces over time according to some rate or predefined mathematical function or algorithm. This encourages the holder of the NFT to use the NFT, or transfer it to another user who can then decide whether to cash it out for its remaining value.

In some embodiments, the API calls defined in Table 1 may be used to support this functionality. Alternatively (and in the case of use of existing smart contract technology), different API calls may be used.

C. Game Function NFTs

As noted herein, NFTs can be used to access/unlock functionality in software applications, such as gaming software applications. This subsection specifies further embodiments contemplated for gaming software applications, some of which may applicable to software applications in general.

In such a gaming embodiment, a user may be the owner of a digital item (for example a digital award), as represented by an NFT. The NFT may be stored on a blockchain that is not under the control of the gaming software operator, or within a centralized system under control of the gaming software operator or an associated third party. The user's account identifier in the gaming software application may be associated with the NFTs the user is holding at any given time (e.g., the gaming software application may check the blockchain from time to time, periodically, or based on receiving various triggers to determine the current holder of these NFTs).

The NFT may then be used to prove the user's rights to modified gameplay in the gaming software application (such as wagering games that utilize RNGs to provide results), which may allow altered or non-standard gameplay from the user's account identifier. For example, games that the user plays may have a different visual appearance (e.g., a different skin), animations, or soundtrack when compared with games played by users not in possession of the NFT. Other embodiments may allow improved return-to-player (RTP) values for games (such as higher RTPs for a user holding such an NFT), new or improved bonus rounds in games, or additional free spins in the event that a user triggers free spins. Any gameplay may be modified by use of the NFT. For instance, the NFT may represent access to a special weapon or ability in a role playing game, or a particular famous persona in a sports-based game.

In one use case, the NFT may prove ownership of a particular award that modifies gameplay and that is finite, for example coins, units of cryptocurrency, or gaming tokens. Then, such awards may be provided to various users, with NFTs transferred to these users to prove ownership thereof. Users may be allowed to trade these NFTs (and, therefore, ownership of the awards) on the blockchain, with the value of the awards only determined by what another user is willing to pay for them.

A user may, in this manner, choose to keep an award for themselves, potentially modifying their gameplay experience at a particular gaming provider, or may trade the award to another user who is willing to purchase the relevant NFT. For example, a user holding such an NFT may not see sufficient value therein if they are not a relatively active player of any gaming software application that supports the NFT. Another user may be willing to pay the original user a significant amount for the NFT, as the award may have much more value to them if they have a higher playing frequency. The original user may then trade the NFT for a much higher value than what it would have been worth to them during gameplay.

It is further envisaged that the awards may be utilized by different gaming software operators. For example, the awards (e.g., in the form of a cryptocurrency coin) of a first gaming software operators can be recognized by a second gaming provider, and the second gaming software operators may offer similar or alternative rewards for its gaming software applications. Alternatively, the holding of an NFT may be used by gaming software operators to reward the player in the real-world, for example access to a particular casino area, bar area, discounts from retailers, and the like.

Notably, game-based NFTs may incorporate any of the features of value-based NFTs described herein.

D. Gaming Outcome NFTs

These embodiments are variations on the outcome NFTs described above, but focus on gaming software applications. An NFT creator may mint an NFT that represents an outcome of one or more plays of a gaming software application. For example, such an NFT may represent a winning outcome of a wager in a wagering game. The outcome may then be considered a digital good for which the NFT proves ownership. The outcome may be encoded into the NFT itself or encoded in off-chain metadata. The outcome may be a value that the user could add to their own cryptocurrency wallet in order to redeem the award or prize associated therewith. Like other types of NFTs, gaming outcome NFTs may be traded with other users.

In some cases, the outcome may be a mystery prize, for example an unknown number of free spins, access to a bonus round, a monetary award, gameplay modification, or the like. Anything that could be the result of general gameplay could be provided in the form of such an NFT. The award could also be digital, such as cryptocurrency or gaming tokens. By trading the NFT, this mystery prize may be traded between users without any user knowing the true value or attributes of the award. This could be considered similar to a "mystery box". These outcomes may or may not have expiry times and/or varying values. When an award associated with an NFT is used by or opened by a user, the NFT may be automatically burnt so that no other user can exploit the NFT in future.

In one use case, a user is awarded a mystery box as a prize in a wagering game. Ownership of the mystery box is proven by verifying the entity that holds an associated NFT. The NFT is given to the user, and serves as ownership of the award. The user may freely trade the NFT with other users, at a price determined by the users themselves. Once a user views or retrieves the content of the box, the NFT may be burn. This NFT-based mystery box could be awarded alongside a normal win (i.e., a user may receive an NFT and a monetary reward), or could be the primary award received (i.e., the user may only receive the NFT).

Notably, gaming outcome NFTs may incorporate any of the features of value-based NFTs and/or game-based NFTs described herein.

E. Example Operations

Figure 13A:
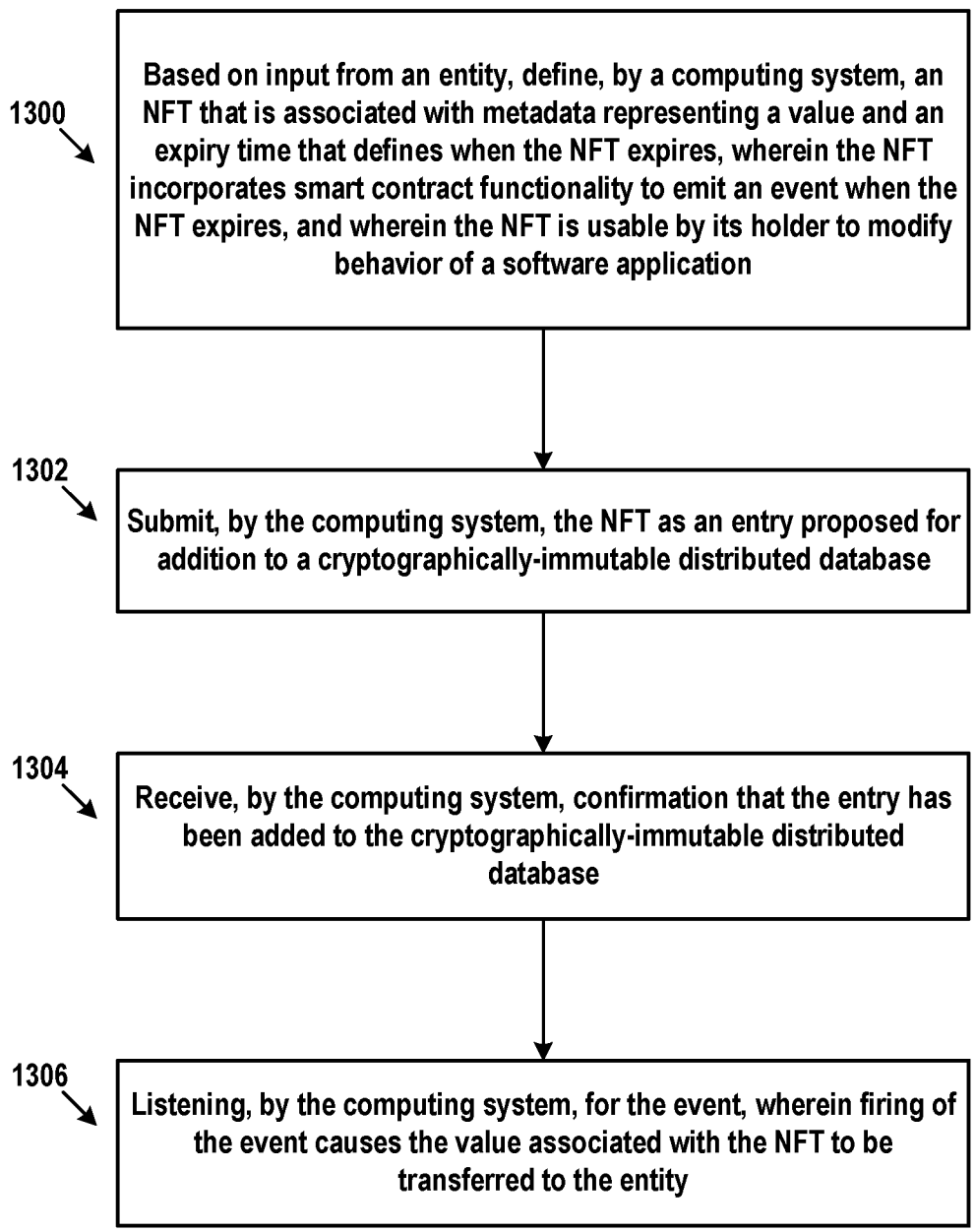
FIGS. 13A, 13B, and 13C are flow charts, in accordance with example embodiments.
Figure 13B:
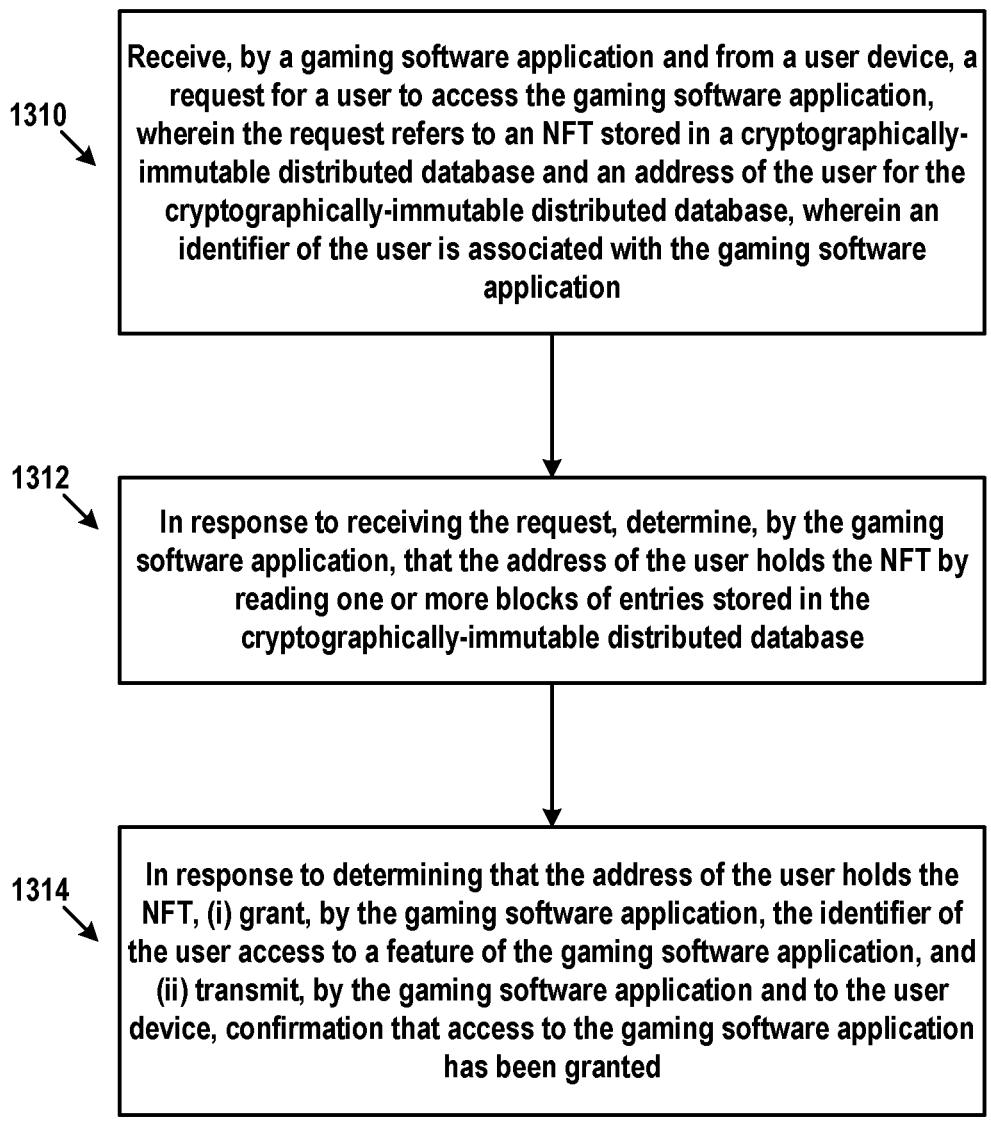
Figure 13C:
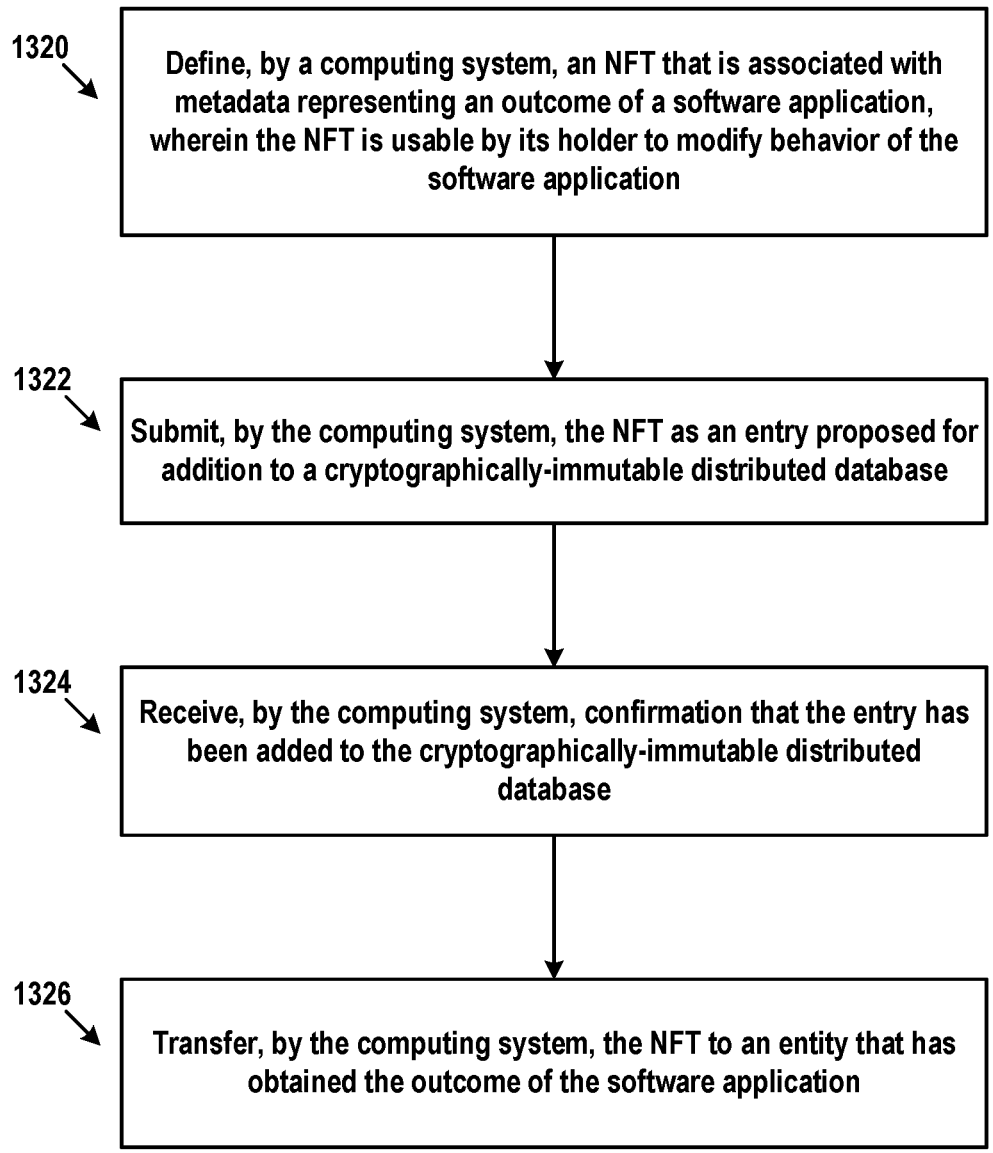

FIGS. 13A, 13B, and 13C are flow charts illustrating example embodiments. The operations illustrated by FIGS. 13A, 13B, and 13C may be carried out by a computing system or computing device that includes a software application configured to grant users access to features based on NFTs. Non-limiting examples of the computing system computing system or computing device include computing device 300 or server cluster 400, for example. However, the operations can be carried out by other types of devices or device subsystems. For example, the operations could be carried out by a portable computer, such as a laptop or a tablet device.

The embodiments of FIGS. 13A, 13B, and 13C may be simplified by the removal of any one or more of the features shown therein. Further, these embodiments may be combined with features, aspects, and/or implementations of one another and/or any of the previous figures or otherwise described herein. Such embodiments may include instructions executable by one or more processors of the one or more server devices of the system or virtual machine or container. For example, the instructions may take the form of software and/or hardware and/or firmware instructions. In an example, the instructions may be stored on a non-transitory computer readable medium. When executed by one or more processors of the one or more servers, the instructions may cause the one or more servers to carry out various operations of the embodiments.

Block 1300 of FIG. 13A involves, possibly based on input from an entity, defining, by a computing system, an NFT that is associated with metadata representing a value and an expiry time that defines when the NFT expires, wherein the NFT incorporates smart contract functionality to emit an event when the NFT expires, and wherein the NFT is usable by its holder to modify behavior of a software application.

Block 1302 involves submitting, by the computing system, the NFT as an entry proposed for addition to a cryptographically-immutable distributed database.

Block 1304 involves receiving, by the computing system, confirmation that the entry has been added to the cryptographically-immutable distributed database.

Block 1306 involves listening, by the computing system, for the event, wherein firing of the event causes the value associated with the NFT to be transferred to the entity.

In some embodiments, the metadata is stored within the NFT and is included in the entry.

In some embodiments, the metadata is stored in an off-chain digital content system that is separate from the cryptographically-immutable distributed database, and the NFT contains a reference to the metadata.

In some embodiments, the NFT also incorporates smart contract functionality to emit a second event when the NFT is burnt, wherein the second event causes the value to be transferred to a current holder of the NFT.

In some embodiments, the second event causes the value to be transferred to the current holder of the NFT only when burning the NFT occurs before the expiry time.

In some embodiments, the value changes between when the NFT is created and the expiry time.

In some embodiments, the NFT is transferrable from the entity to another entity by way of the cryptographically-immutable distributed database.

In some embodiments, the cryptographically-immutable distributed database is operated by the entity.

In some embodiments, the NFT represents an outcome of the software application.

In some embodiments, the outcome is usable by a current holder of the NFT to modify the behavior of the software application.

Block 1310 of FIG. 13B involves receiving, by a gaming software application and from a user device, a request for a user to access the gaming software application, wherein the request refers to an NFT stored in a cryptographically-immutable distributed database and an address of the user for the cryptographically-immutable distributed database, and wherein an identifier of the user is associated with the gaming software application.

Block 1312 involves, in response to receiving the request, determining, by the gaming software application, that the address of the user holds the NFT by reading one or more blocks of entries stored in the cryptographically-immutable distributed database.

Block 1314 involves, in response to determining that the address of the user holds the NFT, (i) granting, by the gaming software application, the identifier of the user access to a feature of the gaming software application, and (ii) transmitting, by the gaming software application and to the user device, confirmation that access to the gaming software application has been granted.

In some embodiments, the feature of the gaming software application changes a visual appearance, animations, or soundtrack of the gaming software application.

In some embodiments, the gaming software application simulates a wagering game with a return-to-player percentage having a default value, wherein the feature of the gaming software application increases the return-to-player percentage above its default value.

In some embodiments, the gaming software application simulates a wagering game with bonus rounds in addition to standard rounds, wherein the feature of the gaming software application changes operation of the bonus rounds.

In some embodiments, the feature of the gaming software application comprises access to an ability or function only available by way of the NFT.

In some embodiments, the feature of the gaming software application comprises a number of virtual coins, units of cryptocurrency, or gaming tokens usable for gameplay of the gaming software application.

In some embodiments, the NFT is transferrable from the user to another entity.

In some embodiments, the NFT is associated with metadata representing a value and an expiry time that defines when the NFT expires, wherein the value provides access to the feature of the gaming software application.

In some embodiments, the value changes between when the NFT is created and the expiry time.

In some embodiments, a second feature analogous to the feature is supported by a second software application, wherein the NFT can be used to grant access to the second feature in the second software application.

Block 1320 of FIG. 13C involves defining, by a computing system, an NFT that is associated with metadata representing an outcome of a software application, wherein the NFT is usable by its holder to modify behavior of the software application.

Block 1322 involves submitting, by the computing system, the NFT as an entry proposed for addition to a cryptographically-immutable distributed database.

Block 1324 involves receiving, by the computing system, confirmation that the entry has been added to the cryptographically-immutable distributed database.

Block 1326 involves transferring, by the computing system, the NFT to an entity that has obtained the outcome of the software application.

In some embodiments, the metadata is stored within the NFT and is included in the entry.

In some embodiments, the metadata is stored in an off-chain digital content system that is separate from the cryptographically-immutable distributed database, wherein the NFT contains a reference to the metadata.

In some embodiments, the metadata also represents an expiry time that defines when the NFT expires, wherein the NFT incorporates smart contract functionality to emit an event when the NFT expires.

In some embodiments, the metadata also represents a value, wherein burning of the NFT causes the value to be transferred to a current holder of the NFT.

In some embodiments, the value changes between when the NFT is created and the expiry time.

In some embodiments, the NFT is transferrable from the entity to another entity by way of the cryptographically-immutable distributed database.

In some embodiments, the cryptographically-immutable distributed database is operated by a further entity associated with the software application.

In some embodiments, the software application comprises a wagering game, wherein the outcome comprises a result of playing the wagering game.

In some embodiments, the outcome represents a number of virtual coins, units of cryptocurrency, or gaming tokens usable for gameplay of the wagering game.

In some embodiments, the outcome is undefined by the NFT and unknown to a current holder of the NFT until the NFT is used to modify the behavior of the software application.

VI. CLOSING

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid-state drive, or another storage medium.

The computer readable medium can also include non-transitory computer readable media such as non-transitory computer readable media that store data for short periods of time like register memory and processor cache. The non-transitory computer readable media can further include non-transitory computer readable media that store program code and/or data for longer periods of time. Thus, the non-transitory computer readable media may include secondary or persistent long-term storage, like ROM, optical or magnetic disks, solid-state drives, or compact disc read only memory (CD-ROM), for example. The non-transitory computer readable media can also be any other volatile or non-volatile storage systems. A non-transitory computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments could include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A method comprising:
    based on input from an entity, defining, by a computing system, a non-fungible token (NFT) that is associated with metadata representing a value and an expiry time that defines when the NFT expires, wherein the NFT incorporates smart contract functionality to emit an event when the NFT expires, wherein the NFT is usable by its holder to unlock a feature of a software application, and wherein after expiry the NFT can no longer unlock the feature;
    submitting, by the computing system, the NFT as an entry proposed for addition to a cryptographically-immutable distributed database;
    receiving, by the computing system, confirmation that the entry has been added to the cryptographically-immutable distributed database; and
    listening, by the computing system, for the event, wherein firing of the event causes the value associated with the NFT to be transferred to the entity.

2. The method of claim 1, wherein the metadata is stored within the NFT and is included in the entry, or the metadata is stored in an off-chain digital content system that is separate from the cryptographically-immutable distributed database and the NFT contains a reference to the metadata.

3. The method of claim 2, wherein the NFT also incorporates smart contract functionality to emit a second event when the NFT is burnt, and wherein the second event causes the value to be transferred to a current holder of the NFT.

4. The method of claim 1, wherein the value changes between when the NFT is created and the expiry time.

5. The method of claim 1, wherein the NFT is transferrable from the entity to another entity by way of the cryptographically-immutable distributed database.

6. The method of claim 1, wherein the cryptographically-immutable distributed database is operated by the entity.

7. The method of claim 1, wherein the NFT represents an outcome of the software application, and wherein the outcome is usable by a current holder of the NFT to modify a behavior of the software application.

8. A method comprising:
    defining, by a computing system, a non-fungible token (NFT) that is associated with metadata representing an outcome of a software application, wherein the NFT is usable by its holder to unlock a feature of the software application, and wherein the NFT can no longer unlock the feature after the NFT expires;
    submitting, by the computing system, the NFT as an entry proposed for addition to a cryptographically-immutable distributed database;
    receiving, by the computing system, confirmation that the entry has been added to the cryptographically-immutable distributed database; and
    transferring, by the computing system, the NFT to an entity that has obtained the outcome of the software application.

9. The method of claim 8, wherein the metadata is stored within the NFT and is included in the entry, or the metadata is stored in an off-chain digital content system that is separate from the cryptographically-immutable distributed database and the NFT contains a reference to the metadata.

10. The method of claim 8, wherein the metadata defines when the NFT expires, wherein the NFT incorporates smart contract functionality to emit an event when the NFT expires, wherein the metadata also represents a value, and wherein burning of the NFT causes the value to be transferred to a current holder of the NFT.

11. The method of claim 8, wherein the NFT is transferrable from the entity to another entity by way of the cryptographically-immutable distributed database.

12. The method of claim 8, wherein the software application comprises a wagering game, wherein the outcome comprises a result of playing the wagering game.

13. The method of claim 8, wherein the outcome is undefined by the NFT and unknown to a current holder of the NFT until the NFT is used to unlock the feature of the software application.

14. A method comprising:
receiving, by a gaming software application and from a user device, a request for a user to access the gaming software application, wherein the request refers to a non-fungible token (NFT) stored in a cryptographically-immutable distributed database and an address of the user for the cryptographically-immutable distributed database, and wherein an identifier of the user is associated with the gaming software application;
in response to receiving the request, determining, by the gaming software application, that the address of the user holds the NFT by reading one or more blocks of entries stored in the cryptographically-immutable distributed database; and
in response to determining that the address of the user holds the NFT, (i) unlocking, by the gaming software application, access to a feature of the gaming software application for the user, and (ii) transmitting, by the gaming software application and to the user device, confirmation that access to the feature of the gaming software application has been granted, wherein the NFT is associated with metadata representing an expiry time that defines when the NFT expires, and wherein after expiry the NFT can no longer unlock access to the feature.

15. The method of claim 14, wherein the feature changes a visual appearance, animations, or soundtrack of the gaming software application.

16. The method of claim 14, wherein the gaming software application simulates a wagering game with a return-to-player percentage having a default value, and wherein the feature increases the return-to-player percentage above its default value.

17. The method of claim 14, wherein the feature comprises access to an ability or function only available by way of the NFT.

18. The method of claim 14, wherein the metadata also represents a value.

19. The method of claim 18, wherein the value changes between when the NFT is created and the expiry time.

20. The method of claim 14, wherein a second feature analogous to the feature is supported by a second software application, and wherein the NFT can be used to grant access to the second feature in the second software application.

* * * * *